US012332597B2

(12) United States Patent
Katsumata

(10) Patent No.: US 12,332,597 B2
(45) Date of Patent: Jun. 17, 2025

(54) DEVELOPING DEVICE

(71) Applicant: CANON KABUSHIKI KAISHA, Tokyo (JP)

(72) Inventor: Go Katsumata, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/522,751

(22) Filed: Nov. 29, 2023

(65) Prior Publication Data

US 2024/0192633 A1 Jun. 13, 2024

(30) Foreign Application Priority Data

Dec. 7, 2022 (JP) ................................ 2022-195666

(51) Int. Cl.
*G03G 21/16* (2006.01)

(52) U.S. Cl.
CPC ..... *G03G 21/1647* (2013.01); *G03G 21/1676* (2013.01)

(58) Field of Classification Search
CPC ........... G03G 21/1647; G03G 21/1676; G03G 15/08; G03G 15/0896; G03G 21/18
See application file for complete search history.

(56) References Cited

U.S. PATENT DOCUMENTS

| | | | | |
|---|---|---|---|---|
| 9,026,002 B2 | 5/2015 | Sato et al. | | |
| 9,335,725 B2 | 5/2016 | Sato et al. | | |
| 9,885,998 B2 | 2/2018 | Katsumata | | |
| 10,663,914 B2 | 5/2020 | Katsumata | | |
| 2017/0285571 A1* | 10/2017 | Takahashi | .......... | G03G 21/1647 |
| 2022/0404760 A1* | 12/2022 | Son | .................... | G03G 21/1647 |

FOREIGN PATENT DOCUMENTS

| | | |
|---|---|---|
| JP | 2012-058627 A | 3/2012 |
| JP | 2013-182036 A | 9/2013 |
| JP | 2017-173805 A | 9/2017 |

* cited by examiner

*Primary Examiner* — Sandra Brase
(74) *Attorney, Agent, or Firm* — VENABLE LLP

(57) ABSTRACT

A developing device mountable on an image forming apparatus includes a main body, a fixing portion, a connecting portion and a developing side electric contact. The fixing portion is fixed to the image forming apparatus in a state where the main body and the fixing portion are positioned in the image forming apparatus. An urging portion urges the fixing portion so as to generate a moment to the fixing portion about the connecting portion as the rotation center in a state where the main body portion is positioned but not the fixing portion is. When the developing device is pressed by a pressing portion of the image forming apparatus in a state where the fixing portion is fixed, the main body is rotated about the connecting portion as the rotation center so that the developer carrying member is moved from a separated position to a developing position.

10 Claims, 18 Drawing Sheets (a)

(b)

| TILT $\theta$ [°] | MOUNTABILITY |
| --- | --- |
| −5 | × |
| −3 | ○ |
| −1 | ○ |
| 0 | ◎ |
| 1 | ○ |
| 3 | ○ |
| 5 | × |

◎ : MOUNTABLE WITHOUT PRYING

○ : MOUNTABLE WITH ADDITIONAL PUSH

× : UNMOUNTABLE DUE TO PRYING

Fig. 15

DEVELOPING DEVICE

FIELD OF THE INVENTION AND RELATED ART

The present invention relates to a developing device which develops an electrostatic latent image formed on an image bearing member by developer.

As an image forming apparatus, it is known that a configuration in which the developing device is configured to be mountable on and demountable from the image forming apparatus main assembly for making maintenance easier and for replacement. The developing device is capable of moving to a position where a developer carrying member such as a developing roller is separated from a photosensitive drum so as not to be in contact with the image bearing member such as the photosensitive drum, which is provided to the image forming apparatus main assembly, upon mounting on or demounting from the image forming apparatus main assembly.

For example, the developing device, in Japanese Patent Application Laid-Open No. 2012-58627, is configured to be swingable so as to be able to be close to and separated from a photosensitive member unit about a shaft in a state in which the developing device is mounted at a normal mount position of an apparatus main assembly. Furthermore, in the developing device, a bridge member, which bridges an opening portion of a near-side frame of the apparatus main assembly with a near-side frame of the developing device in a vertical direction is attached, and a near-side end portion of the shaft is rotatably supported by a bearing being provided to the bridging member.

In addition, in Japanese Patent Application Laid-Open No. 2012-58627, it is disclosed that a configuration, in which the bridging member is attached to the near-side frame of the apparatus main assembly by inserting the developing device, which is in a state in which the bridging member is combined, to the apparatus main assembly, may be adopted. In such a configuration, the bridging member is to be fixed to the near-side frame of the apparatus main assembly in a state in which the bridging member is supported cantileveredly on the near-side of the developing device via the shaft.

As described in Japanese Patent Application Laid-Open No. 2012-58627, in the configuration in which the bridging member is supported cantileveredly by the developing device, there is a possibility that the bridging member may tilt due to backlash of an engaging portion between the bridging member and the developing device. When the bridging member is attached to the frame of the apparatus main assembly, the bridging member is positioned, for example, by an engagement between a protruding portion, which is provided to either one of the bridging member and the frame, and a hole portion, which is provided to the other. In this case, if the bridging member is inserted into the apparatus main assembly in a state the bridging member is tilted to the developing device, the protruding portion is tilted to the hole portion, and prying may occur upon engaging the protruding portion to the hole portion, and there is a possibility that it becomes difficult to insert the developing device to the normal position of the apparatus main assembly or impossible to insert to the normal position. As a result, replacement workability of the developing device may be reduced.

SUMMARY OF THE INVENTION

An object of the present invention is to improve workability upon mounting a developing device on an image forming apparatus.

In addition, according to an aspect of the present invention, there is provided a developing device mountable on an image forming apparatus, the developing device comprising: a main body portion including a developer container configured to accommodate a developer containing toner and a carrier, and a developer carrying member configured to carry and feed the developer to a developing position where an electrostatic image formed on an image bearing member is developed; a fixing portion fixed to the image forming apparatus to mount the developing device on the image forming apparatus in a state in which the main body portion is positioned in the image forming apparatus and the fixing portion is positioned in the image forming apparatus; a connecting portion configured to connect the main body portion and the fixing portion; and an urging portion, when a first moment is defined as a moment which is generated in the fixing portion due to own weight about the connecting portion as a rotation center in a state in which the main body portion is positioned in the image forming apparatus and the fixing portion is not positioned in the image forming apparatus, configured to urge the fixing portion so as to generate a second moment in an opposite direction to the first moment to the fixing portion about the connecting portion as the rotation center in a state in which the main body portion is positioned in the image forming apparatus and the fixing portion is not positioned in the image forming apparatus, and wherein in a case where the developing device is pressed by a pressing portion of the image forming apparatus in a state in which the fixing portion is fixed to the image forming apparatus, the main body portion is rotated about the connecting portion as the rotation center so that the developer carrying member is moved from a separated position separated from the developing position to the developing position.

Further features of the present invention will become apparent from the following description of exemplary embodiments with reference to the attached drawings.

Figure 6:
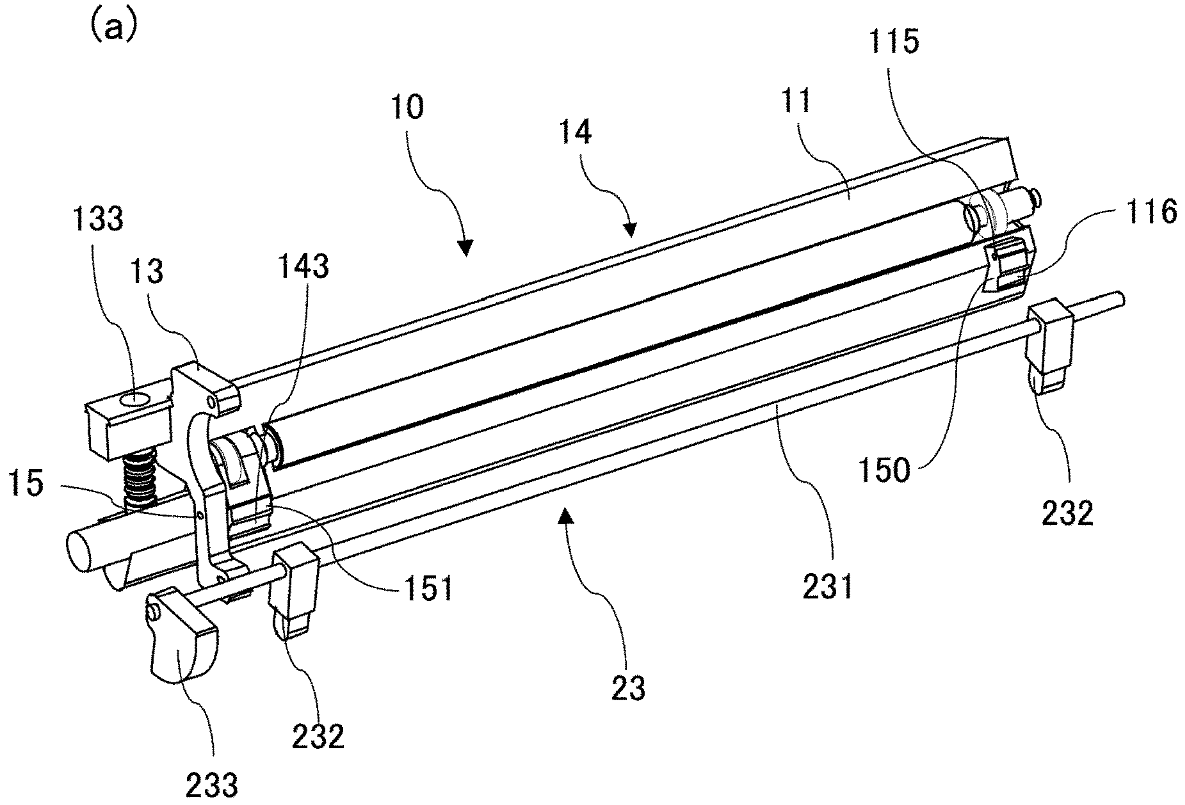
Figure 6:
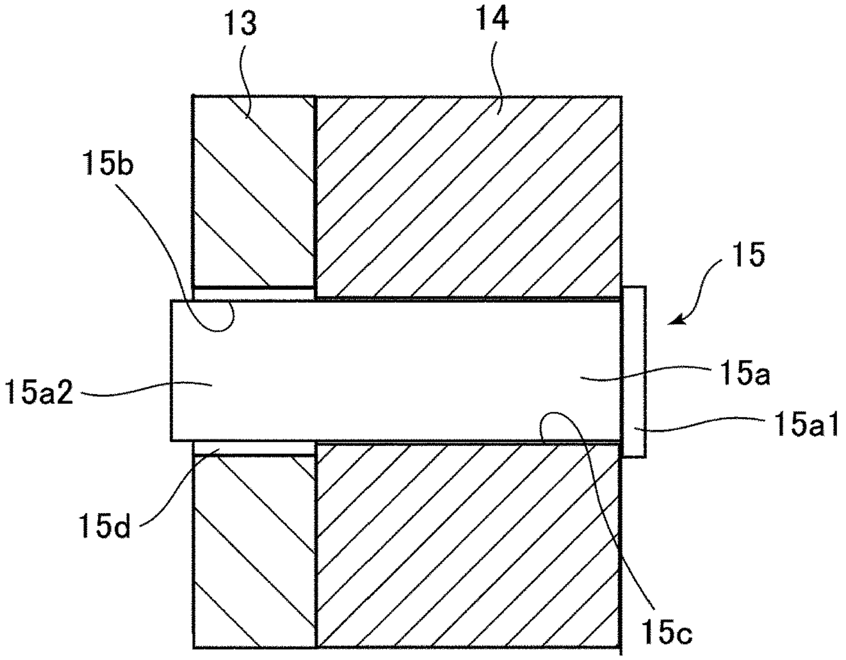

Part (a) of FIG. 6 is a perspective view illustrating a pressing released state of the developing device according to the Embodiment 1, and part (b) of FIG. 6 is an enlarged cross-sectional view of an engaging portion.

Figure 7:
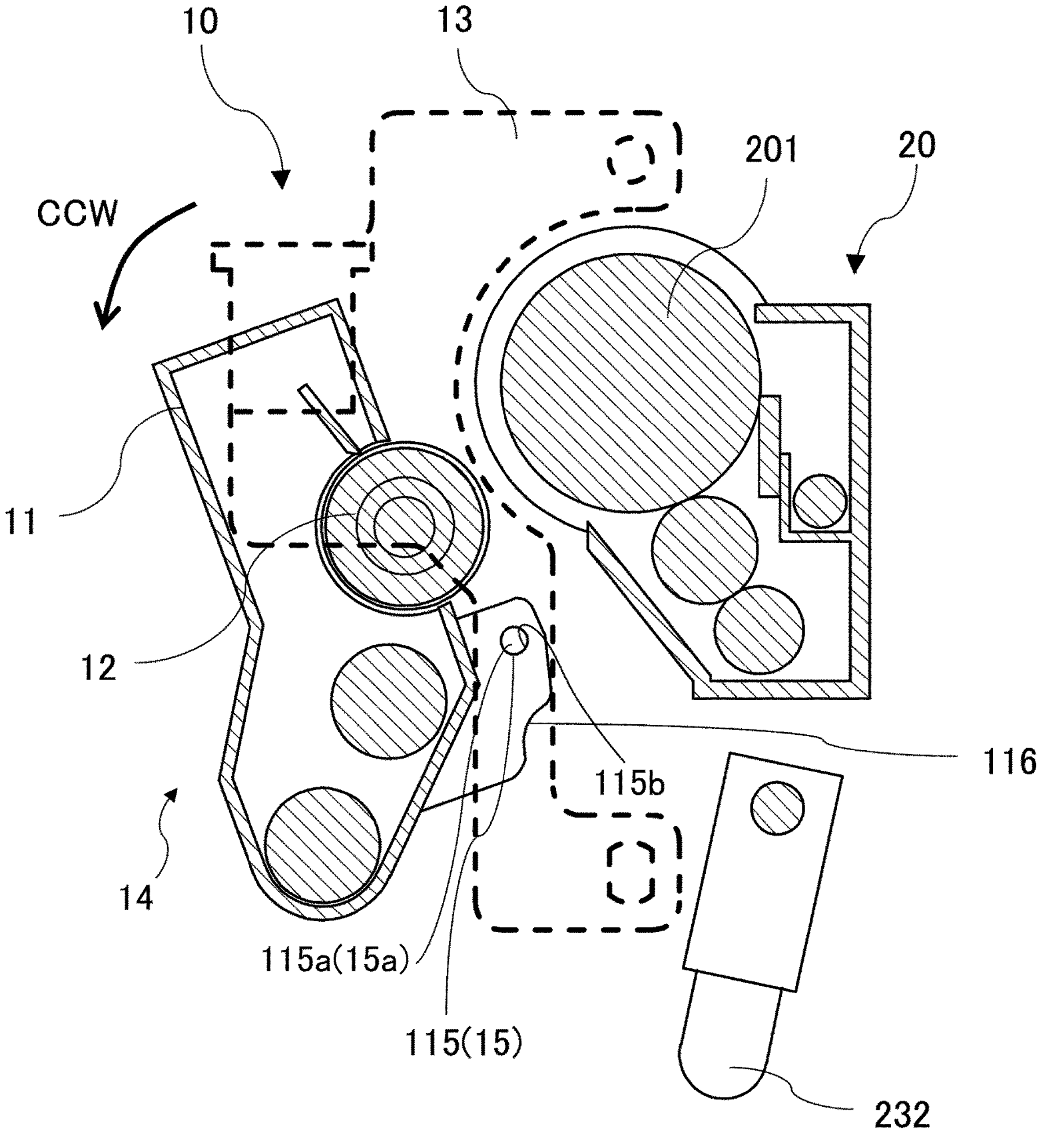

FIG. 7 is a cross-sectional view illustrating the pressing released state of the developing device according to the Embodiment 1.

Figure 8:
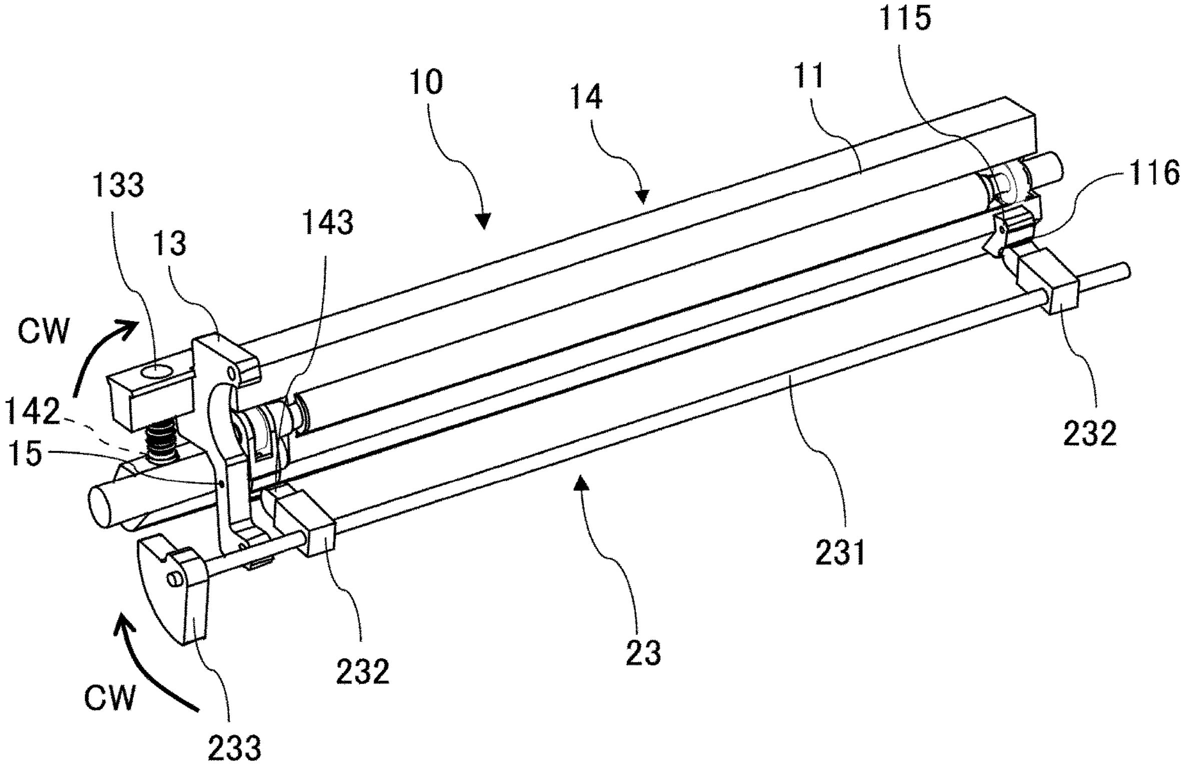

FIG. 8 is a perspective view of a pressing state of the developing device according to the Embodiment 1.

Figure 9:
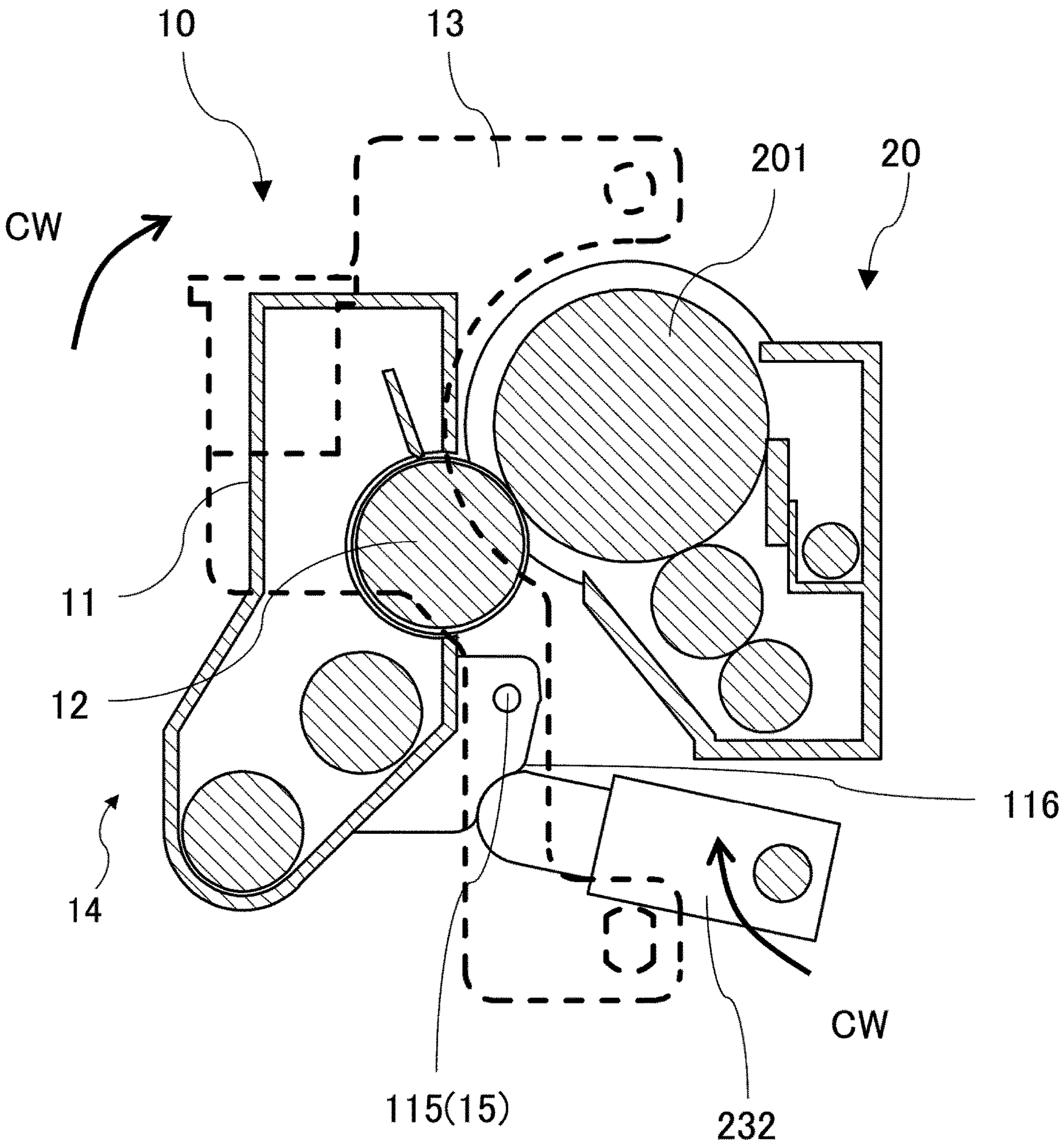

FIG. 9 is a cross-sectional view illustrating the pressing state of the developing device according to the Embodiment 1.

Figure 10:
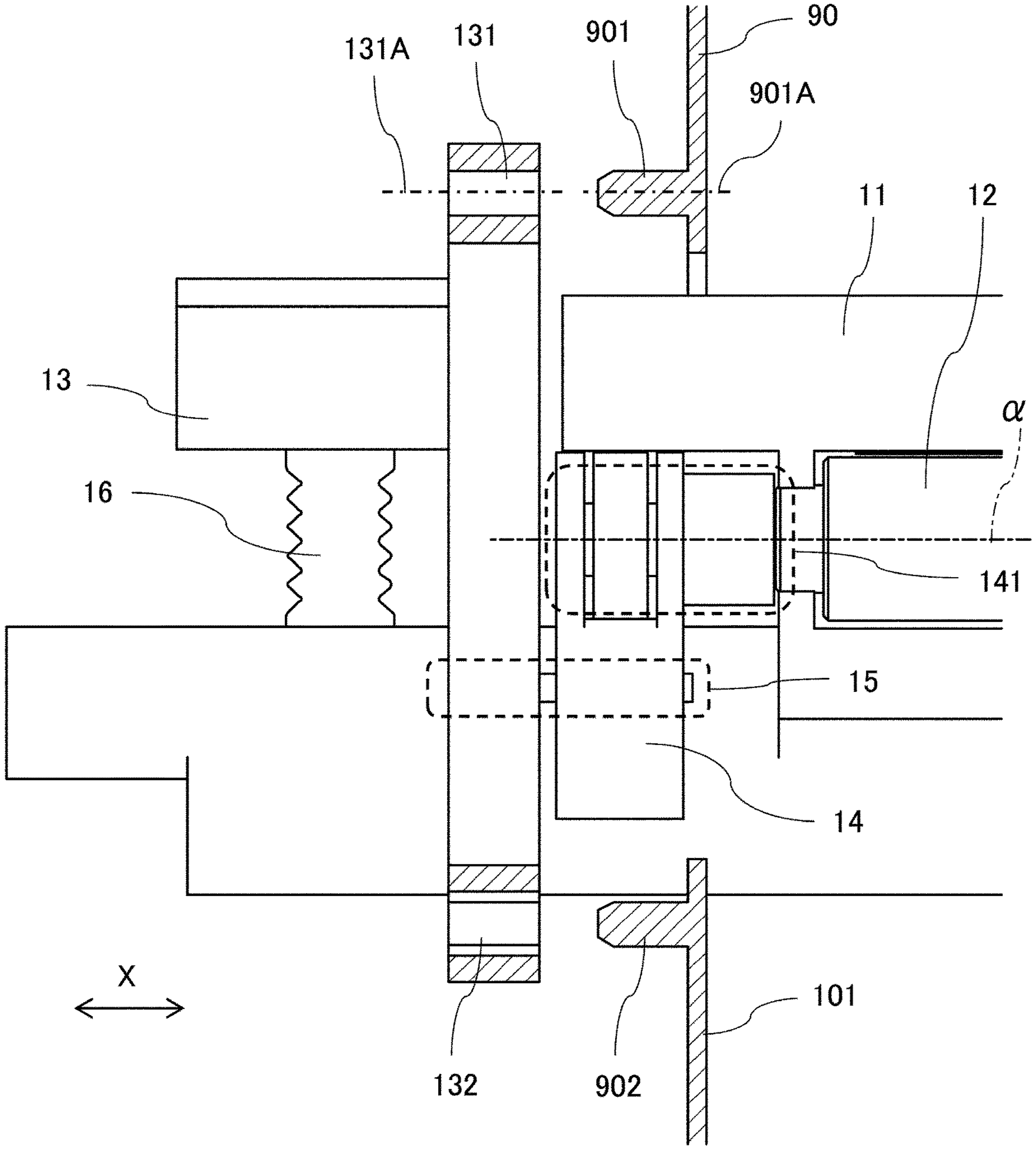

FIG. 10 is a cross-sectional view of a near-side portion of the developing device and a frame, illustrating an ideal state of a positioned posture of a fixing portion of the developing device with respect to the image forming apparatus.

Figure 11:
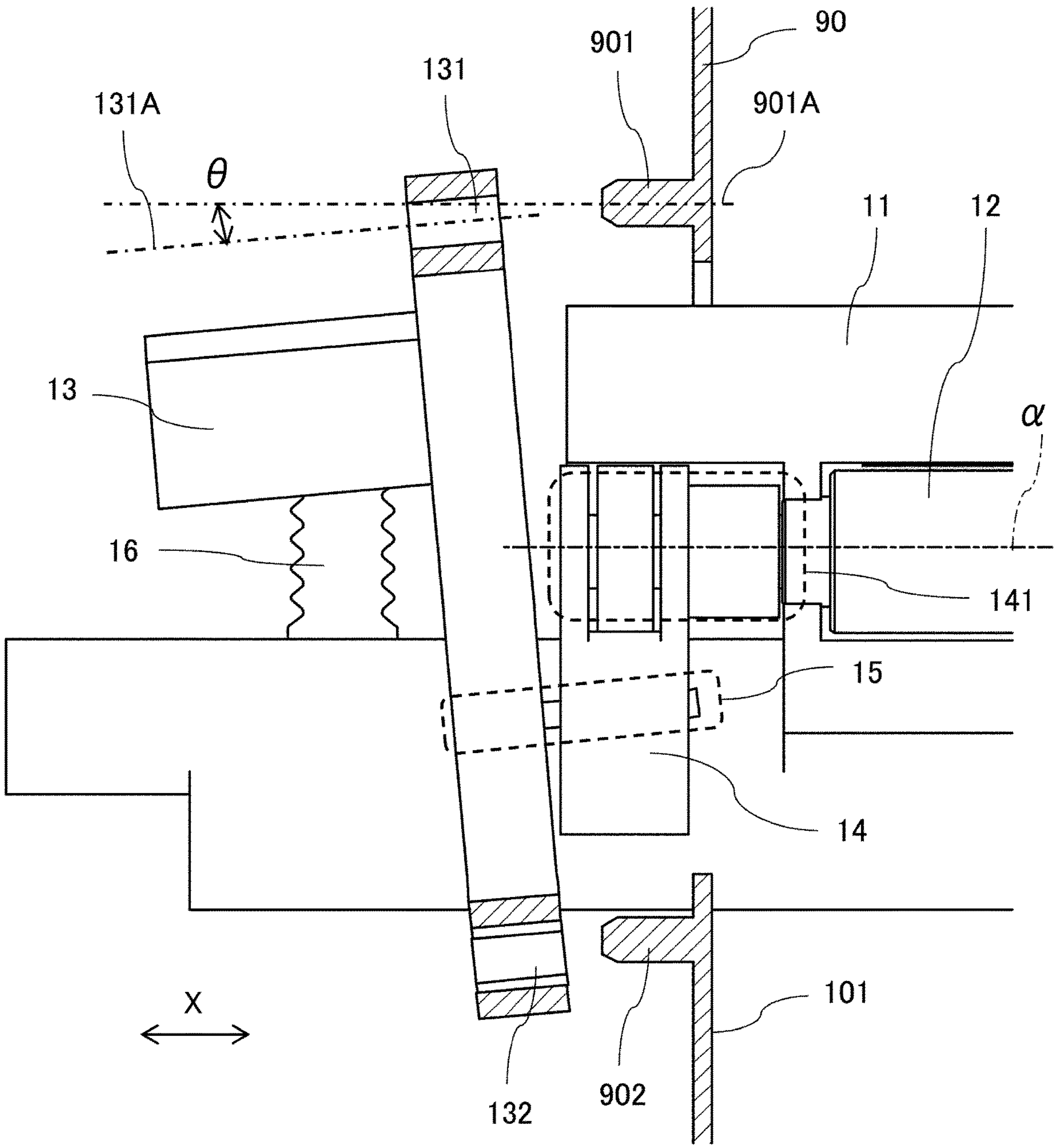

FIG. 11 is a cross-sectional view of the near-side portion of the developing device and the frame, illustrating a state in which the fixing portion of the developing device is tilted with respect to the image forming apparatus.

Figure 12:
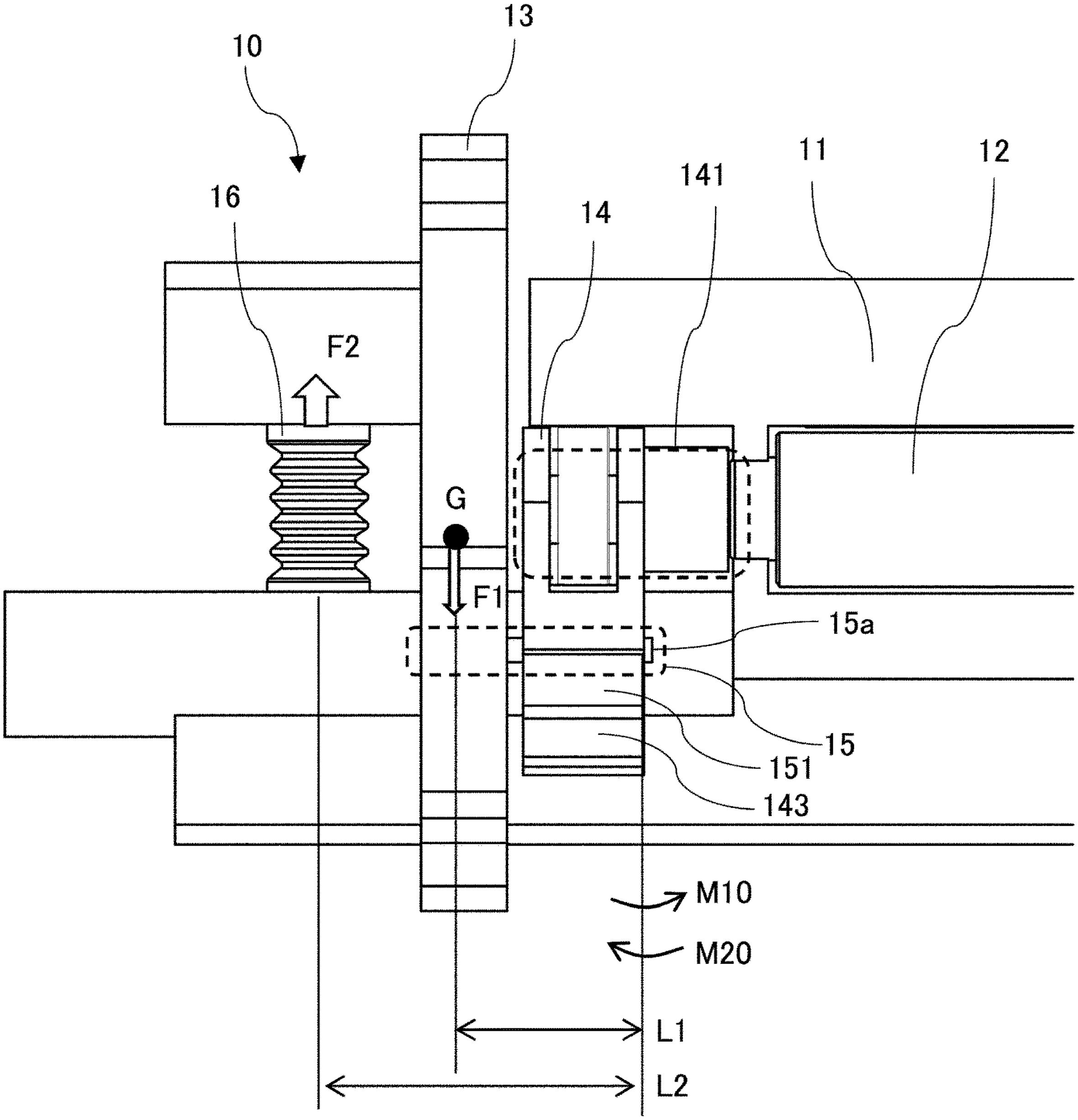

FIG. 12 is a view for describing relationships between force and moments around the fixing portion of the developing device.

Figure 13:
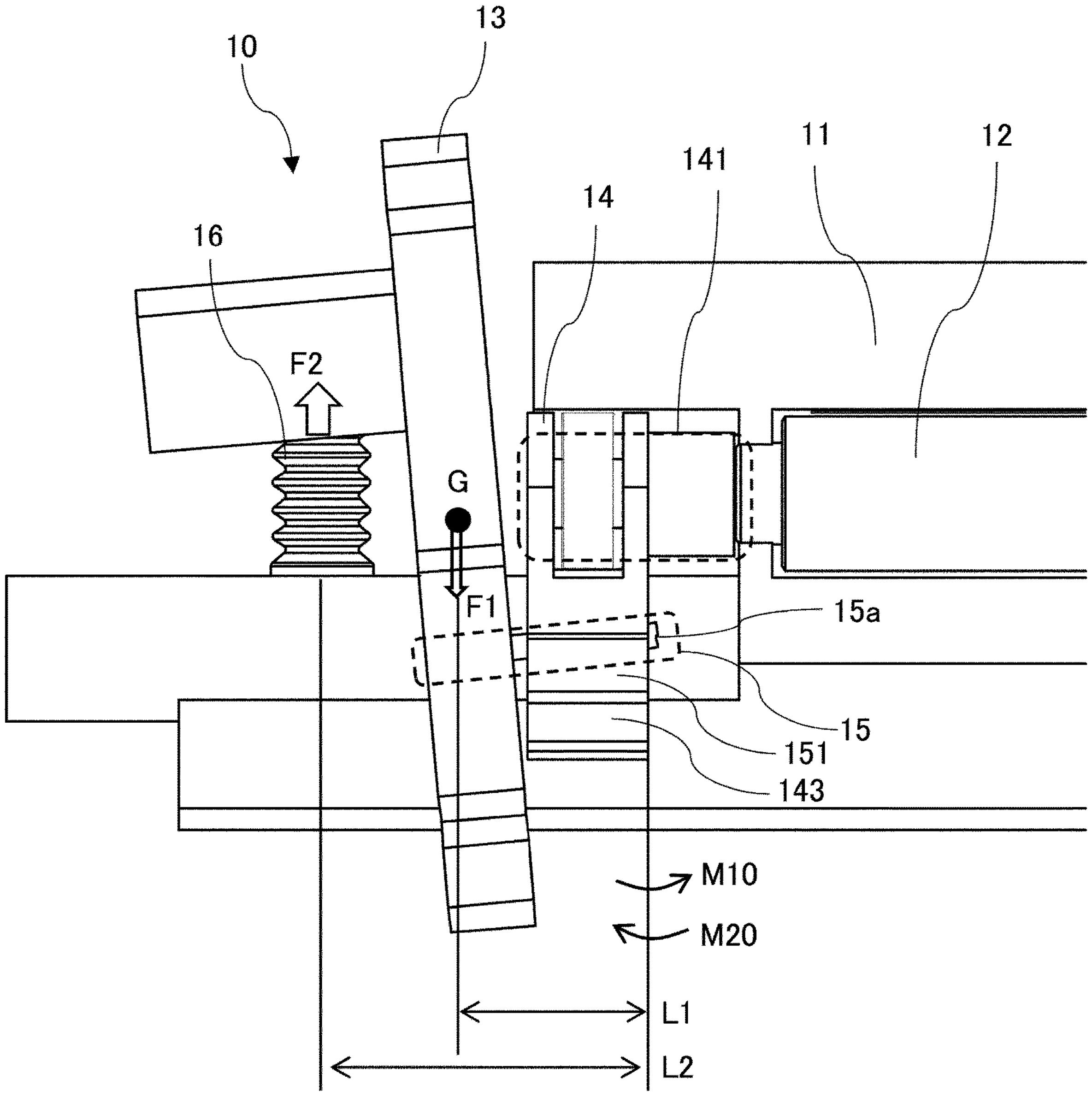

FIG. 13 is a view for describing relationships between the force and moments around the fixing portion of the developing device in a state in which the fixing portion is tilted.

Figure 14:
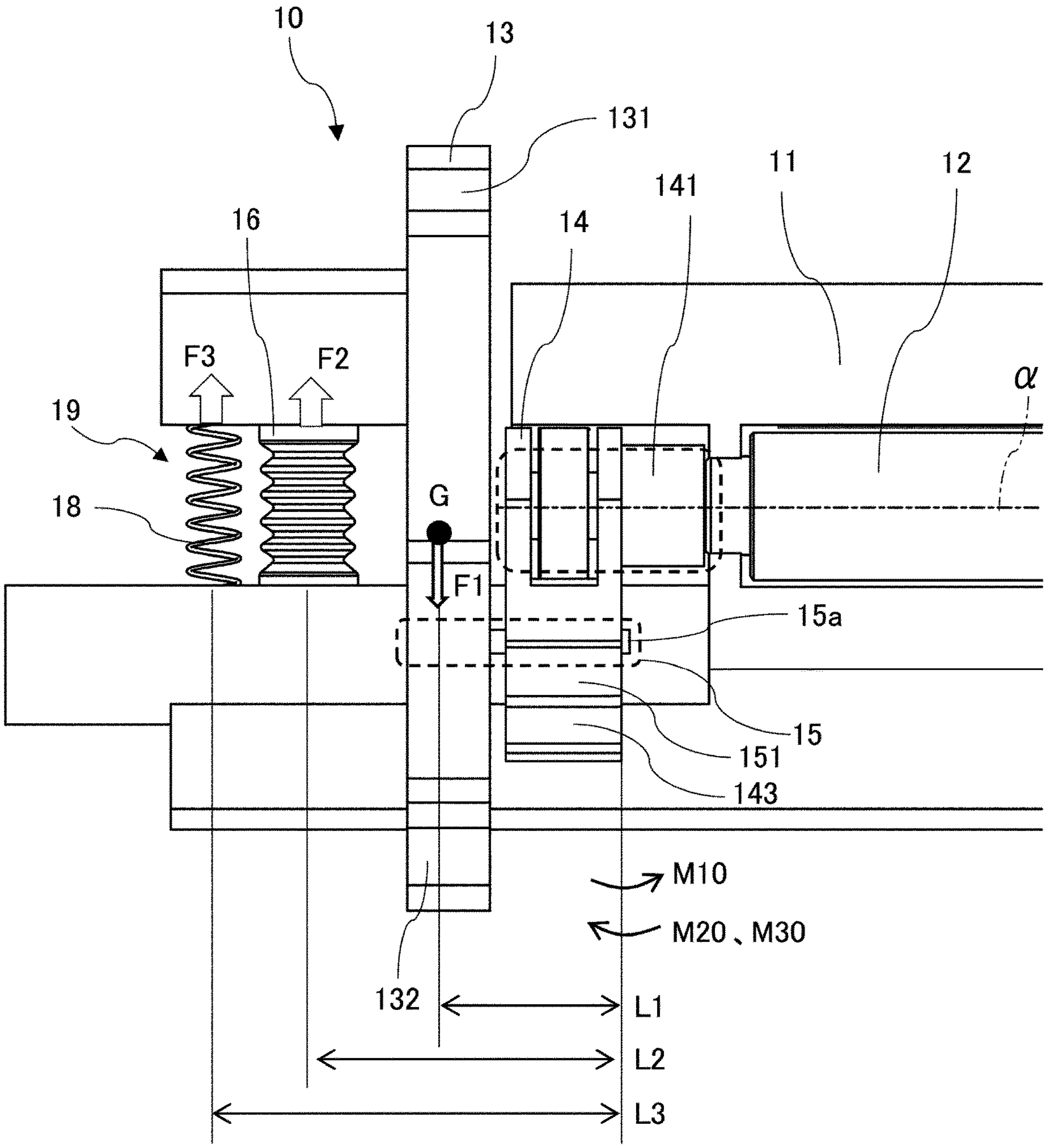

FIG. 14 is a cross-sectional view of the near-side portion of the developing device according to the Embodiment 1.

FIG. 15 is a table showing results from examination of relationships between angles, which is formed between a positioning shaft and a positioning hole, and mountability of the developing device.

Figure 16:
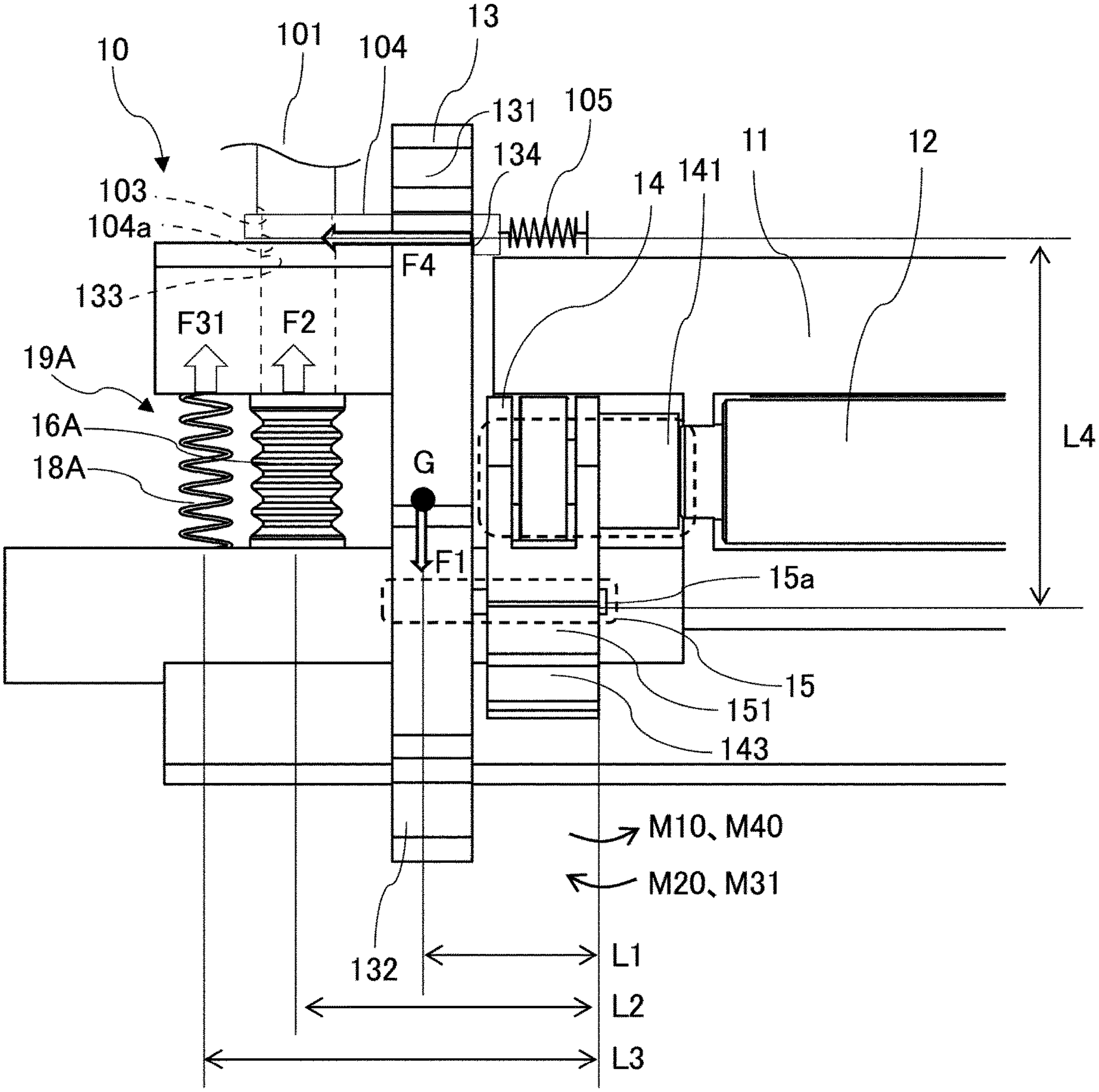

FIG. 16 is a cross-sectional view illustrating a near-side portion of a developing device according to an Embodiment 2.

Figure 17:
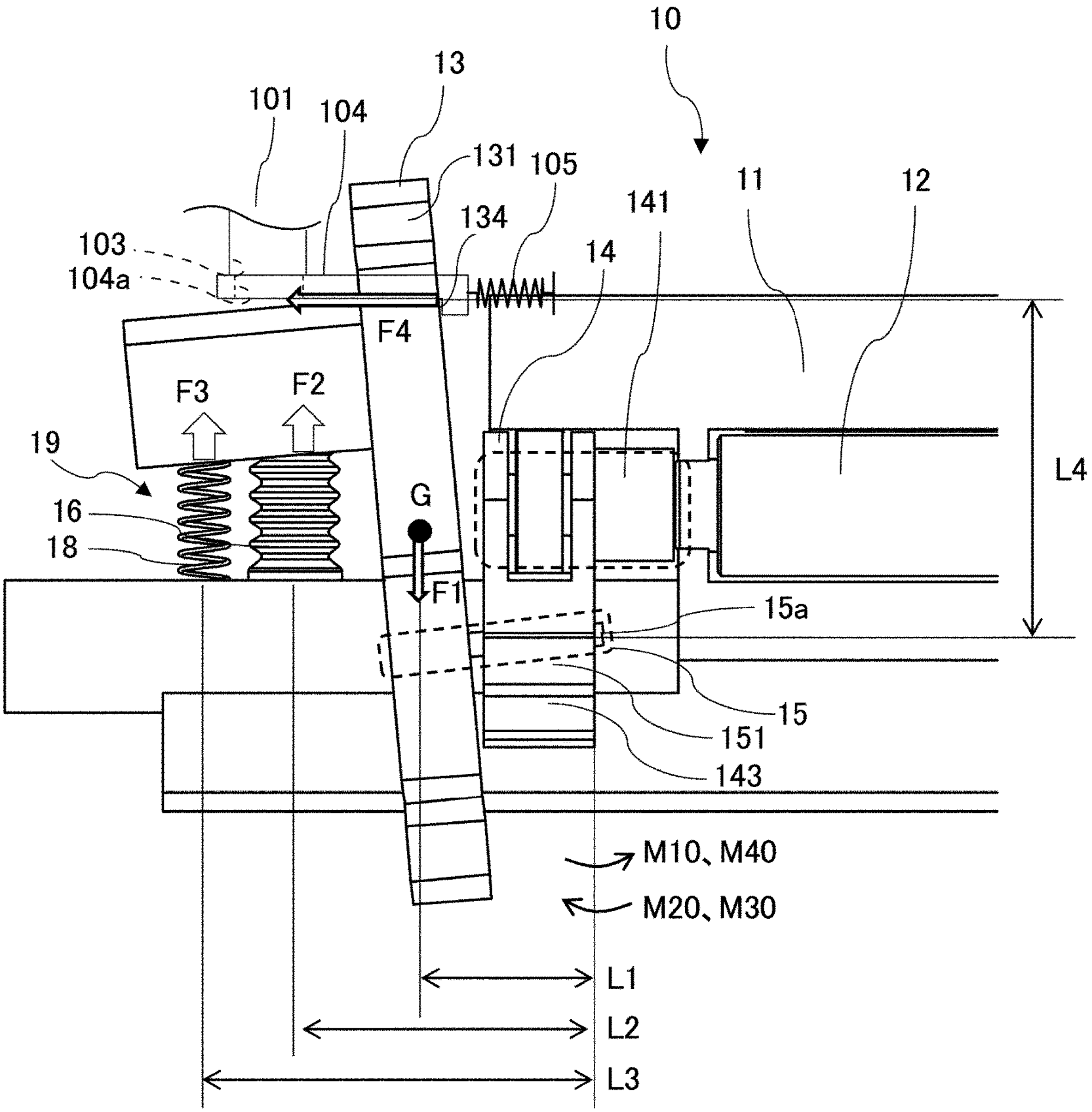

FIG. 17 is a cross-sectional view of a near-side of the developing device to describe a state in which reaction force of a shutter urging portion acts on a fixing portion upon insertion of the developing device to the image forming apparatus main assembly.

Figure 18:
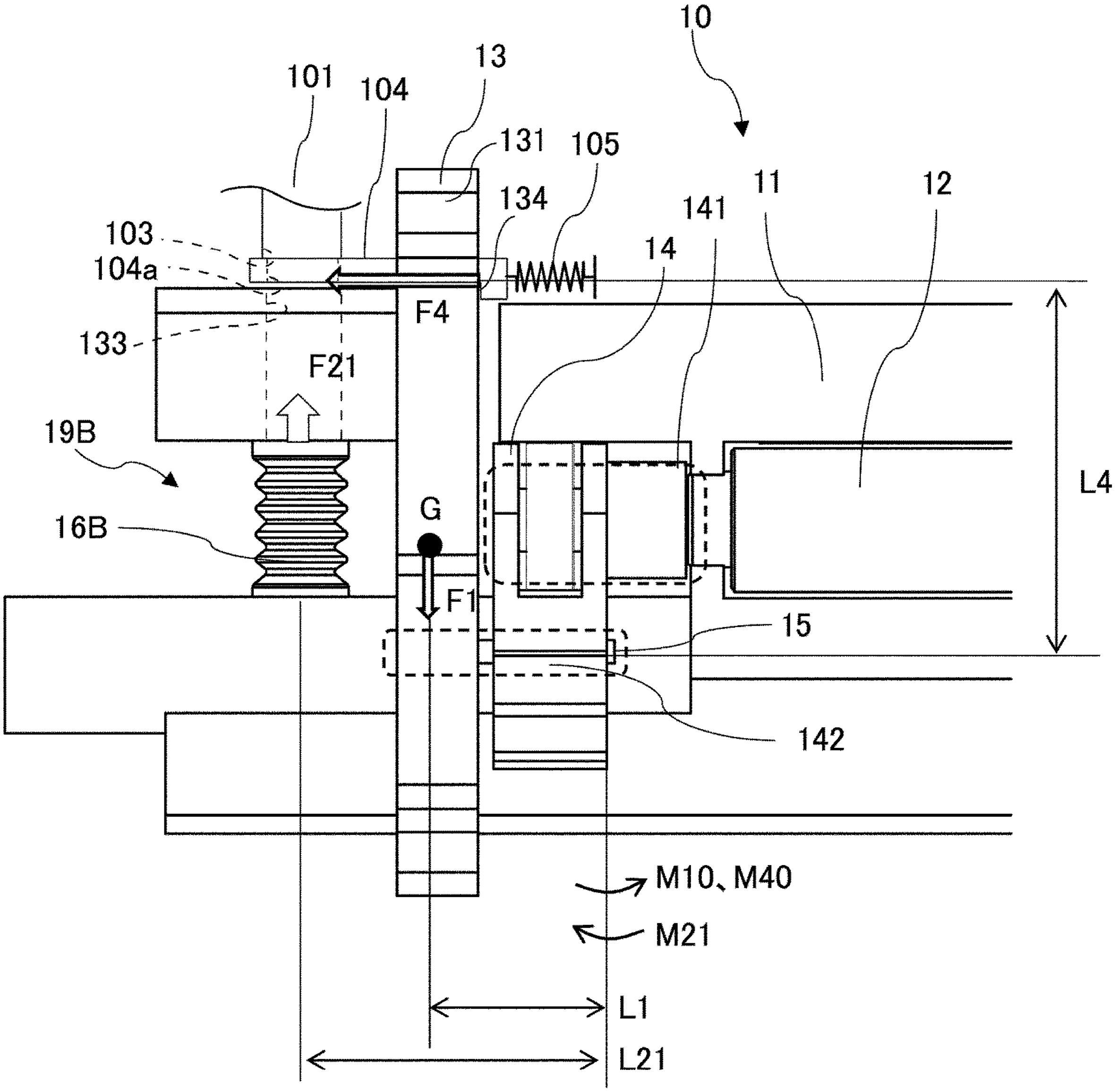

FIG. 18 is a cross-sectional view illustrating a near-side portion of the developing device according to an Embodiment 3.

DESCRIPTION OF THE EMBODIMENTS

Embodiment 1

An Embodiment 1 will be described using FIGS. 1 through 15. First, an overall configuration of an image forming apparatus of the present Embodiment will be described using FIG. 1.

[Image Forming Apparatus]

An image forming apparatus 100 of the present Embodiment is a full-color printer of a tandem type and of an electrophotographic method, provided with four image forming portions PY, PM, PC and PK, each of which is provided with a photosensitive drum 201 as an image bearing member. The image forming apparatus 100 forms toner image on a recording material corresponding to image signals from a document reading apparatus 102 connected to an image forming apparatus main assembly 101 or a host device such as a personal computer communicably connected to the image forming apparatus main assembly 101. As the recording material, sheet materials such as paper, plastic film, and cloth may be used. In addition, the image forming portions PY, PM, PC and PK form yellow, magenta, cyan and black toner images, respectively.

Incidentally, the four image forming portions PY, PM, PC and PK being provided to the image forming apparatus 100 have substantially the same configuration except that the developing colors are different. Therefore, the image forming portion PY will be described as a representative portion, and description of the other image forming portions will be omitted.

In the image forming portion PY, a cylindrical-shaped photosensitive member, i.e., the photosensitive drum 201, as the image bearing member, is provided. The photosensitive drum 201 is driven and rotated by driving force transmitted from a driving portion, not shown, being provided to the image forming apparatus main assembly 101. In the image forming portion PY, a charging roller 204 as a charging portion, a developing device 10, a primary transfer roller 31 as a transfer member, and a cleaning blade 206 as a cleaning member are arranged around the photosensitive drum 201. An exposure device (laser scanner in the present Embodiment) 22 as an exposure portion is disposed below the photosensitive drum 201 in FIG. 1.

Toner is supplied to the developing device 10 from a toner bottle 21 as a toner accommodating container via a toner conveyance path, not shown. In addition, a cleaning roller 205 as a charger cleaning member, which cleans a charging member, is disposed in the image forming portion PY in contact with the charging roller 204 (see FIG. 3). In the present Embodiment, the charging roller 204 is made to be in contact with a surface of the photosensitive drum 201 with predetermined pressing force by an urging member such as a spring, for example, and rotates driven by a rotation of the photosensitive drum 201. In addition, the cleaning roller 205 is made to be in contact with a surface of the charging roller 204 by predetermined pressing force by an urging member such as a spring, for example, and rotates driven by the rotation of the charging roller 204.

Figure 1:
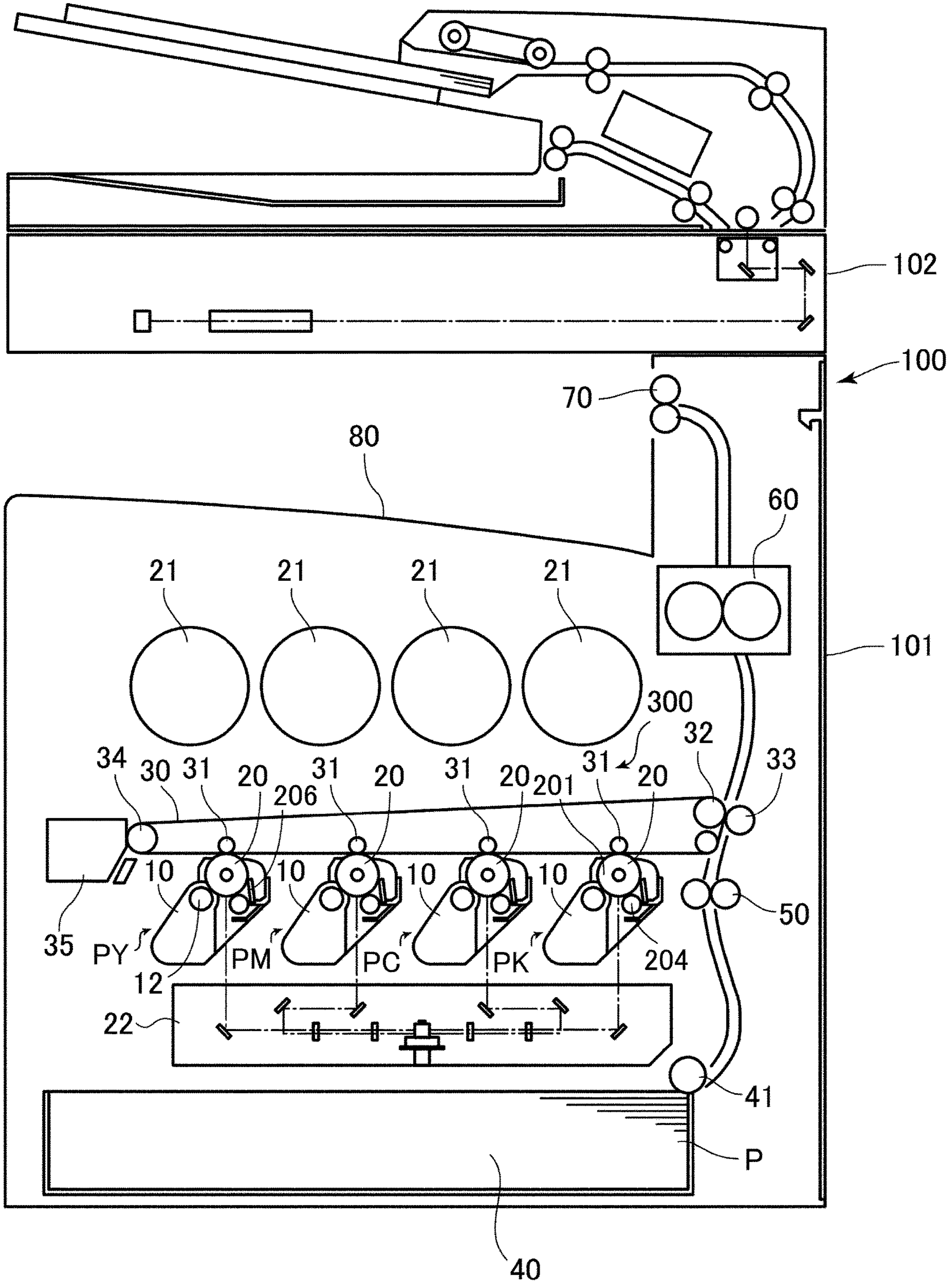
FIG. 1 is a cross-sectional view of an overall configuration of an image forming apparatus according to an Embodiment 1.

Above each image forming portion in FIG. 1, an intermediary transfer device 300 is disposed. The intermediary transfer device 300 is configured so that an endless intermediary transfer belt 30 as an intermediary transfer member is stretched around a plurality of rollers to be circulated (rotated). Primary transfer rollers 31 are disposed in positions opposite to each photosensitive drum 201 on an inner peripheral surface side (back surface side) of the intermediary transfer belt 30. The primary transfer roller 31 is pressed against the photosensitive drum 201 via the intermediary transfer belt 30, to form a primary transfer portion where the intermediary transfer belt 30 and the photosensitive drum 201 are in contact with each other. The primary transfer roller 31 rotates driven by a rotation of the intermediary transfer belt 30.

In addition, a secondary transfer roller 32, which is a roller-shaped secondary transfer member, is disposed in a position opposite to a secondary transfer opposite roller 33 disposed on an outer peripheral surface side (front surface side) of the intermediary transfer belt 30. The secondary transfer roller 32 is pressed against the secondary transfer opposite roller 33 via the intermediary transfer belt 30, to form a secondary transfer portion where the intermediary transfer belt 30 and the secondary transfer opposite roller 33 are in contact with each other. In addition, a belt cleaning device 35 as an intermediary transfer member cleaning portion is disposed on the outer peripheral surface side of the intermediary transfer belt 30, in a position opposite to a tension roller 34. The intermediary transfer belt 30 is formed in the endless-shape by dielectric resin such as polyimide.

A fixing device 60 is disposed downstream of the secondary transfer portion in a recording material conveyance direction to fix the toner image to the recording material P. The fixing device 60 is provided with, for example, a fixing roller as a fixing rotating member, which is heated by a heating source such as a heater, and a pressing roller as a pressing rotating member, which forms a fixing nip portion between the fixing roller. And by heating and pressurizing the toner image on the recording material conveyed to the fixing nip portion, the toner image is fixed to the recording material.

In a lower portion of the image forming apparatus 100, a cassette 40, in which the recording materials P are accommodated, is disposed. The recording material P fed from the cassette 40 is conveyed to a registration roller 50 by a conveyance roller 41. Then, a leading end of the recording material P is in contact with the registration roller 50, which is in a stopped state, and an oblique movement of the recording material P is corrected by forming a loop. And synchronizing with the toner image on the intermediary transfer belt 30, a rotation of the registration roller 50 is started and the recording material P is conveyed to the secondary transfer portion.

A process for, for example, forming a full-color image with four colors with the image forming apparatus 100, which is configured as described above, will be described. First, when an image forming operation starts, the surface of the rotating photosensitive drum 201 is uniformly charged to predetermined potential of predetermined polarity by the charging roller 204. In the present Embodiment, voltage is applied to the charging roller 204 from a high voltage power source, not shown, and the surface of the photosensitive drum 201 is charged by electric discharge occurring against the surface of the photosensitive drum 201.

Next, the photosensitive drum 201 is exposed with a laser beam, which corresponds to the image signal, emitted from the exposure device 22. As a result, an electrostatic latent image, which corresponds to the image signal, is formed on the photosensitive drum 201. The electrostatic latent image on the photosensitive drum 201 (on the image bearing member) is developed by the toner as a developer accommodated in the developing device 10 to become a visible image. In the present Embodiment, normal charging polarity of the toner is negative. The developing device 10 is provided with a developing roller 12 as a developer carrying member which carries and conveys the toner to an opposite portion (developing position) to the photosensitive drum 201. The developing roller 12 is driven and rotated. In addition, during the development, predetermined developing voltage is applied to the developing roller 12 from a high voltage power source, not shown, as a developing power source.

The toner image formed on the photosensitive drum 201 is primary transferred to the intermediary transfer belt 30 in the primary transfer portion, which is constituted with the primary transfer roller 31 disposed across the intermediary transfer belt 30. Upon this, primary transfer bias, which is voltage of reverse polarity (positive polarity in the present Embodiment) to the charging polarity of the toner during the development, is applied to the primary transfer roller 31 from a high voltage power source, not shown. The toner remaining on the surface of the photosensitive drum 1 after the primary transfer (transfer remaining toner) is removed by the cleaning blade 206, collected in a collected toner conveyance path, and discharged out of a photosensitive member unit 20 by a toner conveyance screw 207 (see FIG. 3).

These operations are performed sequentially in each image forming portion of yellow, magenta, cyan and black, and the toner images of the four colors are superimposed on the intermediary transfer belt 30. Thereafter, the recording material P accommodated in the cassette 40 is conveyed to the secondary transfer portion in accordance with timing of the formation of the toner image. And in the secondary transfer portion, the toner images of the four colors on the intermediary transfer belt 30 are secondarily transferred at once onto the recording material P by an action of the secondary transfer opposite roller 33. When the recording material P passes through the secondary transfer portion, secondary transfer voltage is applied to the secondary transfer roller 32, which is voltage of reverse polarity to the charging polarity of the toner during the development, from a high voltage power source, not shown. The toner remaining on the intermediary transfer belt 30 which is not fully transferred in the secondary transfer portion is removed by the belt cleaning device 35.

Next, the recording material P is conveyed to the fixing device 6, and is heated and pressurized by passing through the fixing nip portion. The toner on the recording material P is then melted, mixed and fixed to the recording material P as a full-color image. The recording material P is then discharged onto a discharge tray 80 by a discharge roller 70. By this, a series of image forming process is completed.

Incidentally, the image forming apparatus 100 of the present Embodiment may also be able to form a single-color image or a multi-color image by using one or some of the image forming portions for a desired color or some of four colors, for example, a single-color image such as a black image, etc.

[Photosensitive Member Unit]

Figure 2:
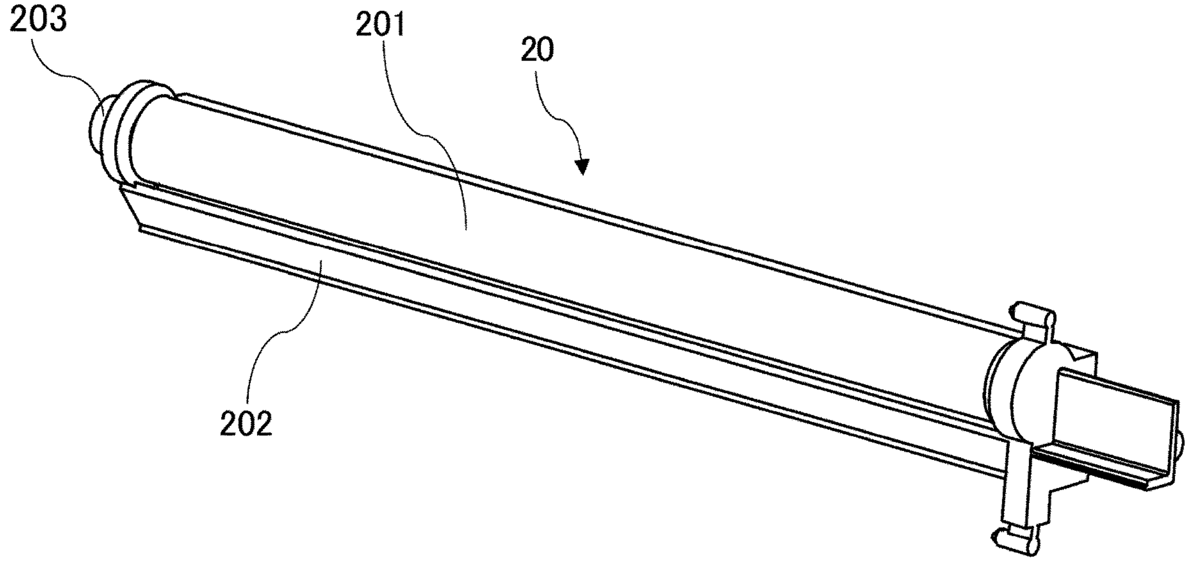
FIG. 2 is a perspective view of a photosensitive member unit according to the Embodiment 1.
Figure 3:
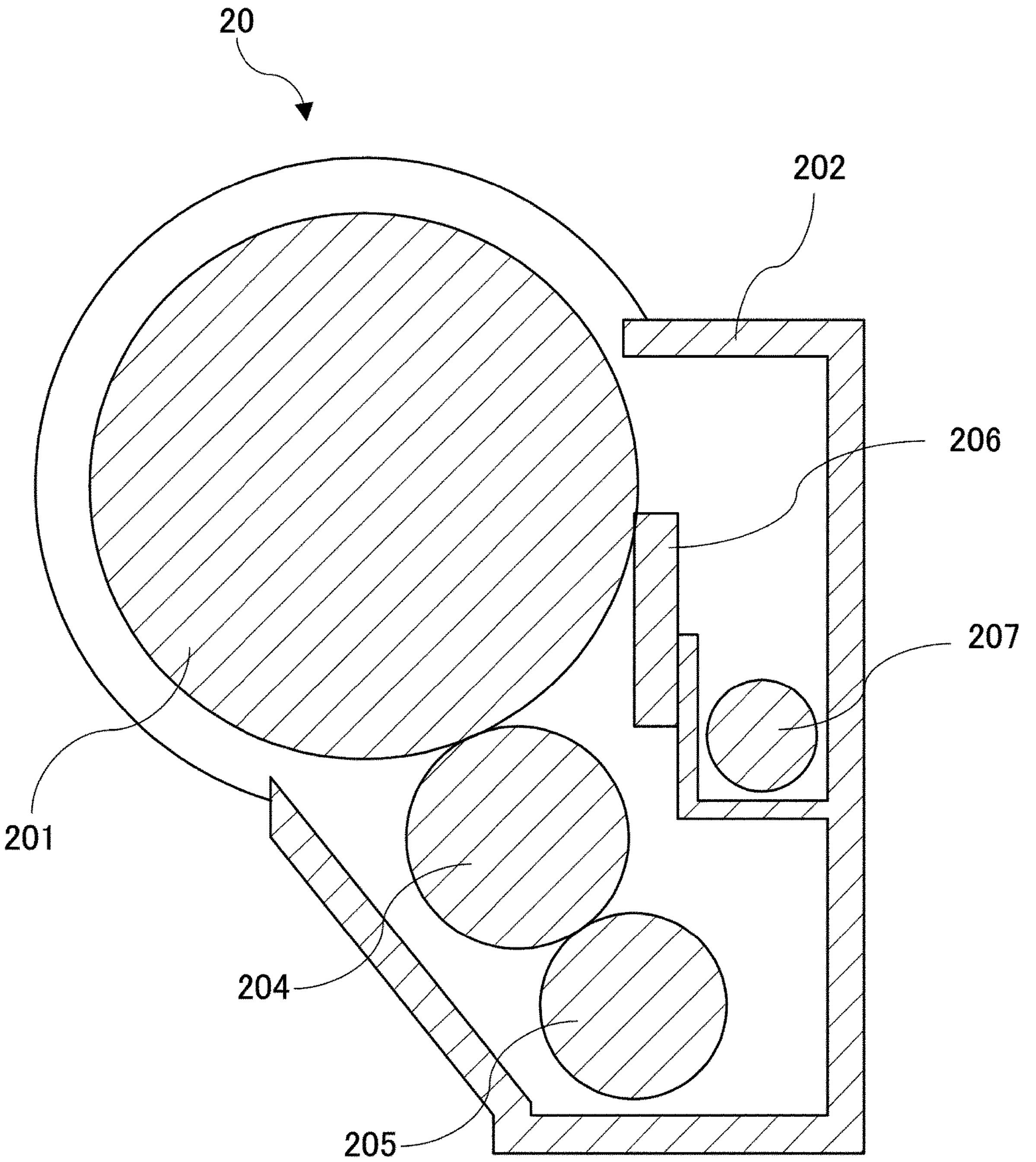
FIG. 3 is a cross-sectional view of the photosensitive member unit according to the Embodiment 1.

Next, a configuration of the photosensitive member unit 20 will be described using FIG. 2 and FIG. 3. The photosensitive member unit 20 of the present Embodiment has a configuration in which the photosensitive drum 201 as the photosensitive member, the charging roller 204 as the charging member, the cleaning roller 205 as the charger cleaning member, and the cleaning blade 206 as the cleaning member are integrally held with a drum frame 202 as a frame member. In addition, the photosensitive member unit 20 is configured to be mountable on and demountable from the image forming apparatus main assembly 101 by sliding the photosensitive member unit 20 along a longitudinal direction (rotational axis direction of the photosensitive drum 201) to and from the image forming apparatus main assembly 101, and be replaceable for maintenance, etc.

On the drum frame 202, the photosensitive drum 201 is held so as to be rotatable about the rotational axis via a bearing (not shown). The photosensitive drum 201 is provided with a coupling 203 to be rotated by receiving driving force from a motor as a driving source, not shown, which is provided to the image forming apparatus main assembly 101, in a state in which the photosensitive drum 201 is mounted on the image forming apparatus main assembly 101.

The charging roller 204 is supported rotatably by a charging roller bearing, not shown, and is pressed against the photosensitive drum 201 by a pressing spring, not shown. The cleaning roller 205 is supported rotatably by a cleaning roller bearing, not shown, and is pressed against the charging roller 204 by a pressing spring, not shown. In addition, the cleaning blade 206 is fixed to the drum frame 202 as the cleaning member for cleaning the surface of the photosensitive drum 201, which is provided in contact with the surface of the photosensitive drum 201 with respect to a counter direction to a rotational direction of the photosensitive drum 201 during the image formation.

Near the cleaning blade 206, the toner conveyance path, which collects and conveys the transfer remaining toner removed from the surface of the photosensitive drum 201 by the cleaning blade 206, is provided. In the toner conveyance path, the toner conveyance screw 207 as a conveyance member to convey the collected toner out of the photosensitive member unit 20, is provided. The toner conveyed out of the photosensitive member unit 20 by the toner conveyance screw 207 is collected in a collected toner container, not shown, being provided in the image forming apparatus main assembly 101.

[Developing Device]

Figure 4:
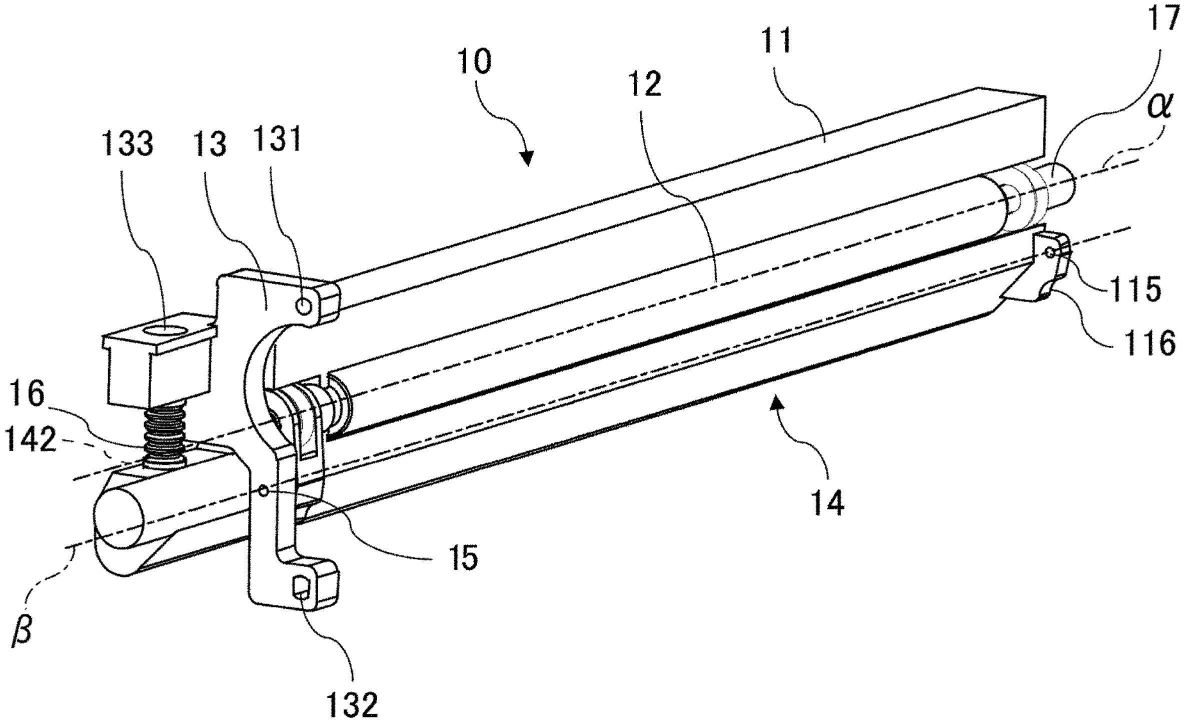
FIG. 4 is a perspective view of a developing device according to the Embodiment 1.
Figure 5:
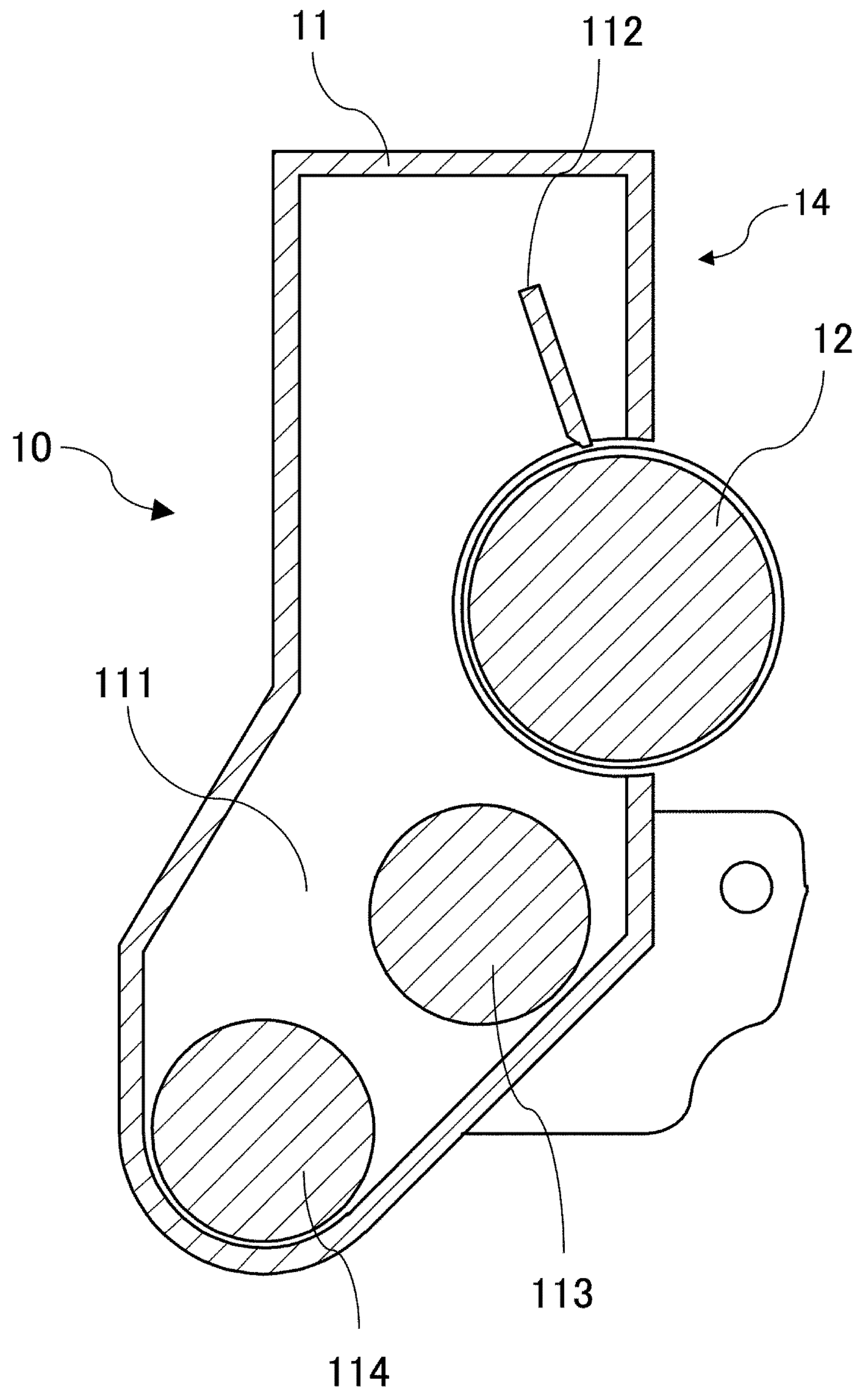
FIG. 5 is a cross-sectional view of the developing device according to the Embodiment 1.

Next, a configuration of the developing device 10 will be described using FIG. 4 and FIG. 5. The developing device 10 is a type of developing device using a two-component developer including non-magnetic toner and a magnetic carrier. The developing device 10 of the present Embodiment is configured to be mountable on and demountable from the image forming apparatus main assembly 101 by sliding the developing device 10 along the longitudinal direction (rotational axis direction of the developing roller 12) to and from the image forming apparatus main assembly 101, and be replaceable for maintenance, etc.

In the present Embodiment, the developing device 10 and the photosensitive member unit 20 are configured to be insertable to and drawable from the image forming apparatus main assembly 101 along the longitudinal direction, respectively. Inserting directions of the developing device 10 and the photosensitive member unit 20 are from a near side to a back side of the image forming apparatus 100 (from a front side to a back side of the paper in FIG. 1). The near side of the image forming apparatus 100 is a side on which an operator operates the image forming apparatus 100, for example, and a side on which an operating portion for operating the image forming apparatus 100, such as an operating panel, is disposed. Hereinafter, when simply referring to the "near side" or the "back side", it should indicate the near side or the back side of the image forming apparatus 100.

In the developing device 10, a toner replenishing port 133 as a replenishing port is provided, and the toner replenishing port 133 is connected to a supply port of the toner conveyance path being provided in the image forming apparatus main assembly 101 when the developing device 10 is mounted on the image forming apparatus main assembly 101. The toner conveyance path is connected to the toner bottle 21, which contains the toner for replenishment, as a developer accommodating container. Therefore, the toner for replenishment is supplied to the toner replenishing port 133 from the toner bottle 21 via the toner conveyance path.

In addition, the developing device 10 is provided with a developer container 11 accommodating the developer and the developing roller 12 as a developer carrying member. The developing roller 12 is held rotatably with respect to the developer container 11 about a rotational axis α, and is configured to develop the electrostatic latent image formed on the photosensitive drum 201 at the developing position in which the photosensitive drum 201 and the developing roller 12 are opposing each other. Drive is transmitted to the developing roller 12 from the back side of the image forming apparatus main assembly 101 via a coupling 17.

In addition, in the developing device 10, a developing blade 112 for regulating a toner coating amount on the surface of the developing roller 12, and a screw member 113 and a screw member 114 for agitating and conveying the toner in a toner accommodating portion 111 in the developer container 11 are provided. In the developing device 10, the developer in the toner accommodating portion 111 is agitated and conveyed by the screw member 113 and the screw member 114, carried onto the surface of the developing roller 12, and a layer thickness of the developer (coating amount) carried on the surface of the developing roller 12 is regulated by the developing blade 112. The developer of which the layer thickness is regulated is conveyed to the developing position by a rotation of the developing roller 12, and is used to develop the electrostatic latent image on the photosensitive drum 201. The developer remaining on the developing roller 12 after the development is collected into the toner accommodating portion 111, and is agitated and conveyed again by the screw member 113 and the screw member 114.

The developing device 10 having such a configuration, after being inserted into the image forming apparatus main assembly 101, is positioned with respect to the photosensitive member unit 20 by being pressed by a development pressing mechanism 23, which will be described below, being provided to the image forming apparatus main assembly 101, and is disposed closely so that the developing roller 12 and the photosensitive drum 201 have a predetermined interval between each other.

[Development Pressing Mechanism]

The developing device 10 is configured to be replaceable for maintenance, etc. as described above, however, in an image forming state, the developing device is disposed in the state being close to the photosensitive drum 201. Therefore, if the developing device 10 is inserted to or removed from the image forming apparatus main assembly 101 in this state, the developing roller 12 or the photosensitive drum 201 may have a rubbing scratch. Therefore, the mounting or the demounting of the developing device 10 or the photosensitive member unit 20 must be performed after the developing roller 12 and the photosensitive drum 201 are made to be separated from each other by a sufficient distance, which prevents both from rubbing against each other.

For this purpose, the developing device 10 of the present Embodiment is provided with a fixing portion 13, which is fixed to the image forming apparatus main assembly 101, and a developing device main assembly 14, which is a movable portion movable with respect to the fixing portion 13. The fixing portion 13 is disposed on an upstream side of the developing roller 12 with respect to the inserting direction of the developing device 10 into the image forming apparatus main assembly 101. That is, the fixing portion 13 is a portion which positions and fixes a near-side portion of the developing device 10 with respect to the image forming apparatus main assembly 101.

In the present Embodiment, as described below, after positioning the fixing portion 13 to a frame 90 of the image forming apparatus main assembly 101 (see FIG. 10, etc.), the fixing portion 13 is fixed to the frame 90 by a fastening member such as a screw. As a result, the developing device 10 is fixed to the image forming apparatus main assembly 101, and is prevented from slipping out of the image forming apparatus main assembly 101. Incidentally, the developing device 10 is not limited to such a configuration to prevent the developing device 10 from slipping out. For example, it may be configured that after the developing device 10 is mounted on the image forming apparatus main assembly 101, as described below, when a pressing lever 233 is rotated to position the developing device main assembly 14 in a pressed position, a part of the pressing lever 233 or a member provided on a pressing shaft 231 may engage with an end surface of a near side of the fixing portion 13. In any case, after the fixing portion 13 is positioned in the frame 90, by the fixing portion 13 and a member on the image forming apparatus main assembly 101 side being fastened or engaged, the developing device 10 should be fixed so as not to slip out to the near side in the inserting direction.

In addition, in the present Embodiment, a movement direction of the developing device main assembly 14 with respect to the fixing portion 13 is a rotational direction about an engaging portion 15, which will be described below. The developing device main assembly 14 is provided with the developing roller 12. And the development pressing mechanism 23 enables the developing device main assembly 14 to be movable to a first position (contact position), in which the developing roller 12 is close to the photosensitive drum 201, and to a second position (separated position), in which the developing roller 12 is further away from the photosensitive drum 201 than the first position. In the contact position, by a part of the developing device main assembly 14 being in contact with a part of the photosensitive member unit 20, a positional relationship between the developing roller 12 and the photosensitive drum 201 is determined.

A configuration and an operation of such development pressing mechanism 23 will be described using part (a) of FIG. 6 through FIG. 9. Part (a) of FIG. 6 and FIG. 7 are a perspective view and a cross-sectional view, respectively, illustrating a development pressing released state, i.e., a state in which the developing device 10 is not pressed against the photosensitive member unit 20 and the developing device main assembly 14 is positioned in the second position in which the developing roller 12 is separated from the photosensitive drum 201. FIG. 8 and FIG. 9 are a perspective view and a cross-sectional view, respectively, illustrating a development pressing state, i.e., a state in which the developing device 10 is pressed against the photosensitive member unit 20 and the developing device main assembly 14 is positioned in the first position in which the developing roller 12 is close to the photosensitive drum 201. Part (b) of FIG. 6 is an enlarged cross-sectional view of the fixing portion 13 and the engaging portion 15 of the developing device main assembly 14, which will be described below.

The development pressing mechanism 23 includes the bar-shaped pressing shaft 231, which is disposed parallel to the longitudinal direction of the developing device 10, and a pressing portion 232 is disposed on the pressing shaft 231. In the present Embodiment, the pressing portions 232 are provided to the pressing shaft 231 at two locations, one at the near side and the other at the back side, and rotate with the pressing shaft 231, respectively. The pressing lever 233 is engaged to the pressing shaft 231 of the near side of the image forming apparatus main assembly 101, and the pressing shaft 231 is configured to be able to be rotated by operating the pressing lever 233. In addition, the pressing portion 232 is urged to be protruding in a direction heading away from the pressing shaft 231 by an urging member such as a spring, not shown.

As shown in FIG. 7 and FIG. 9, in a state in which the developing device 10 is mounted on the image forming apparatus main assembly 101, the developing device main assembly 14 is connected to the fixing portion 13 by the engaging portion 15 on the near side, and is connected to the image forming apparatus main assembly 101 by the engaging portion 115 on the back side. And the developing device main assembly 14 is configured to be rotatable about a rotational axis β (see FIG. 4) of a rotary shaft 15*a* of the engaging portion 15 and a rotary shaft 115*a* of the engaging portion 115. The rotary shaft 15*a* and the rotary shaft 115*a* are disposed on the same axis. In the present Embodiment, on the back side of the developing device 10, the developing device main assembly 14 is positioned directly to the image forming apparatus main assembly 101. On the other hand, on the near side of the developing device 10, the developing device main assembly 14 is positioned with respect to the image forming apparatus main assembly 110 via the fixing portion 13.

The engaging portion 115 on the back side is an engaging portion between the rotary shaft 115*a*, which is provided to the back side of the image forming apparatus main assembly 101, and a hole portion 115*b*, which is formed on a mounting portion 150 being provided to the back side of the developing device main assembly 14. That is, upon the insertion of the developing device 10, the hole portion 115*b*, which is provided on the back side of the developing device main assembly 14, engages with (specifically, fits to) the rotary shaft 115*a*, which is provided on the back side of the image forming apparatus main assembly 101 so as to be protruding toward the near side. As a result, the back side of the developing device main assembly 14 is positioned rotatably about the engaging portion 115 between the rotary shaft 115*a* and the hole portion 115*b*.

As shown in part (b) of FIG. 6, the engaging portion 15 on the near side is constituted by a first hole portion 15*b*, which is provided to the fixing portion 13, a second hole portion 15*c*, which is provided to the developing device main assembly 14, and a rotary shaft 15*a* as a shaft portion, which engages with the first hole portion 15*b* and the second hole portion 15*c*. The rotary shaft 15*a* is a bolt of which a head portion 15*a*1 is formed on a base end portion and an outer peripheral surface of a tip side is formed as a screw portion 15*a*2. An insert nut 15*d* is provided to the fixing portion 13, and an inner peripheral surface of the insert nut 15*d* constitutes the first hole portion 15*b*. That is, the inner peripheral surface of the first hole portion 15*b* is formed as a female screw portion. Incidentally, an inner peripheral surface of the second hole portion 15*c* is a cylindrical portion without being formed as a screw portion. In addition, the female screw portion may be formed directly on the inner peripheral surface of the first hole portion 15*b*.

Upon connecting the fixing portion 13 and the developing device main assembly 14, the first hole portion 15*b* of the fixing portion 13 is disposed coaxially with the second hole portion 15*c*, which is formed in a mounting portion 151 being provided to the near side of the developing device main assembly 14, and the rotary shaft 15*a* is inserted from the second hole portion 15*c*. Then, by screwing and fixing the screw portion 15*a*2 of the rotary shaft 15*a* into the first hole portion 15*b*, the mounting portion 151 is held between the fixing portion 13 and the head portion 15*a*1. As a result, the developing device main assembly 14 is connected to the fixing portion 13 by the engaging portion 15 so as to be rotatable about the rotary shaft 15*a*.

Incidentally, regarding the engaging portion 115 on the back side, the rotational shaft may be provided to the developing device main assembly 14 side, and the hole portion may be provided to the image forming apparatus main assembly 101 side. In addition, regarding the engaging portion 15 on the near side, it may be configured that the inner peripheral surface of the second hole portion 15*c* may be formed as the female screw portion, the first hole portion 15*b* may be formed as a cylindrical surface without having the screw portion, and the rotary shaft 15*a* may be inserted from the first hole portion 15*b*. In this case, by the fixing portion 13 being held between the head portion 15*a*1 of the rotary shaft 15*a* and the mounting portion 151 of the developing device main assembly 14, the developing device main assembly 14 is connected to the fixing portion 13 so as to be rotatable about the rotary shaft 15*a*.

In addition, the engaging portion 15 on the near side may be constituted by a shaft portion, which is provided to one of the fixing portion 13 and the developing device main assembly 14, and a hole portion, which is provided to the other portion and can engage with the shaft portion. For example, the shaft portion is provided to the fixing portion 13 and the hole portion is provided to the developing device main assembly 14. In addition, the tip of the shaft portion is formed as the screw portion, and the nut is screwed onto the screw portion after the shaft portion is inserted through the hole portion, thereby connecting the fixing portion 13 and the developing device main assembly 14. Of course, the relationship between the shaft portion and the hole portion may be reversed. That is, the shaft portion may be provided to the developing device main assembly 14 side and the hole portion may be provided to the fixing portion 13 side.

In the present Embodiment, the rotary shaft 115*a* and the hole portion 115*b*, which constitute the engaging portion 115 of the back side, and the rotary shaft 15*a* and the second hole portion 15*c*, which constitute the engaging portion 15 of the near side, are engaged (specifically, fitted) so that the developing device main assembly 14 is rotatable about the engaging portion 15 and the engaging portion 115, respectively. Therefore, backlash occurs in the engaging portion 15 between the fixing portion 13 and the developing device main assembly 14, as described below.

Thus, the developing device main assembly 14 of the developing device 10 can rotate movably between the contact position and the separated position with respect to the photosensitive member unit 20 with the rotary shaft 15*a* and the rotary shaft 115*a* as a center of rotation. When the developing device main assembly 14 is just mounted on a mount position with respect to the image forming apparatus main assembly 101, the developing device main assembly 14 is in a state tilted in a counterclockwise CCW direction in FIG. 7 by its own weight about the rotational axis β of the rotary shaft 15*a* and the rotary shaft 115*a*, and the developing roller 12 is separated from the photosensitive drum 201 as shown in FIG. 7. That is, the developing device main assembly 14 is in the separated position. As such, when the developing roller 12 and the photosensitive drum 201 are in the separated state from each other, the developing device 10 may be mounted on and demounted from the image forming apparatus main assembly 101 without colliding or contacting each other.

When the pressing lever 233 is rotated in a clockwise CW direction with the developing device 10 being mounted on the image forming apparatus main assembly 101, the pressing portions 232 on the pressing shaft 231 are in contact with a pressing force receiving portion 143 and a pressing force receiving portion 116 as contacting portions, which are provided to the developing device main assembly 14, as shown in FIG. 8 and FIG. 9, respectively.

The pressing force receiving portion 143 and the pressing force receiving portion 116 are formed on the mounting portion 151 on the near side of the developing device main assembly 14 and the mounting portion 150 on the back side of the developing device main assembly 14, respectively.

Then, the developing device main assembly 14 rotates clockwise CW about the rotational axis β of the rotary shaft 15*a* and the rotary shaft 115*a*, and the developing roller 12 moves to the contact position (first position) in which the developing roller 12 is close to the photosensitive drum 201. At this time, the developing device main assembly 14 is urged in the clockwise CW direction by the pressing portion 232 being urged by the urging member, not shown. The position of the pressing portions 232 in this state are defined as a third position.

In addition, when the developing device main assembly 14 is in a state being in contact with the photosensitive member unit 20, by rotating the pressing lever 233 in counterclockwise CCW direction, the state in which the pressing portions 232 on the pressing shaft 231 are in contact with the force receiving portion 143 and the force receiving portion 116 is released, as shown in FIG. 6 and FIG. 7. The developing device main assembly 14 is then tilted in counterclockwise CCW direction, the contact between the developing roller 12 and the photosensitive drum 201 is released, and the developing roller 12 moves to the separated position (second position).

The position of the pressing portions 232 in this state are defined as a fourth position. Thus, the pressing portions 232 are movable between the third position, as shown in FIG. 8 and FIG. 9, in which the pressing portions 232 are in contact with the pressing force receiving portion 143 and the pressing force receiving portion 116 and presses the developing device main assembly 14 in the contacting position, and the fourth position, as shown in part (a) of FIG. 6 and FIG. 7, in which the pressing portions 232 are separated from the pressing force receiving portion 143 and the pressing force receiving portion 116 and makes the developing device main assembly 14 movable to the separated position.

As described above, the developing device 10 is divided into two parts: the developing device main assembly 14 as a movable part which rotates about the rotary shaft 15*a* and the rotary shaft 115*a* by the pressing force of the development pressing mechanism 23, and the fixing portion 13 which is fixed to the image forming apparatus main assembly 101. Specifically, a position of the fixing portion 13 is regulated with respect to the image forming apparatus main assembly 101 and is connected to the developing device main assembly 14 by the engaging portion (first connecting portion) 15 via the rotary shaft 15*a*.

In addition, the toner replenishing port 133, where the developer is replenished from the image forming apparatus main assembly 101 side, is provided to the fixing portion 13. The toner replenishing port 133 and a connection port 142 (FIG. 4 and FIG. 8), which is provided to the developing device main assembly 14, is connected by a developer conveyance path 16, which is formed by a bellows-shaped elastic member. The connection port 142 communicates with the toner accommodating portion 111 inside the developing device main assembly 14. That is, the developer conveyance path 16 is disposed between the fixing portion 13 and the developing device main assembly 14, connecting the toner replenishing port 133 and the connection port 142, and supplying the developer replenished from the toner replenishing port 133 to the toner accommodating portion 111 inside the developing device main assembly 14 via the connection port 142. The developer conveyance path 16 is elastically deformable and can communicate with the toner replenishing port 133 and the connection port 142 in either the contact position (pressed position) or the separated position (a pressing released position) of the developing device main assembly 14.

[Prying Upon Insertion of the Developing Device]

Next, a prying upon mounting of the developing device 10 will be described using FIGS. 10 through 13. FIG. 10 is a view illustrating an ideal state of a posture just before the developing device 10 is positioned to the image forming apparatus main assembly 101. The developing device 10 is configured to be insertable and removable in an X direction shown in FIG. 10 with respect to the image forming apparatus main assembly 101. The X direction is parallel to the longitudinal direction of the developing device 10, that is, the rotational axis direction a of the developing roller 12. The image forming apparatus main assembly 101 is provided with a first positioning shaft 901 and a second positioning shaft 902 for positioning the developing device 10 with respect to the image forming apparatus main assembly 101. The first positioning shaft 901 and the second positioning shaft 902 are formed in the frame 90 on the near side of the image forming apparatus main assembly 101 so as to be protruded toward the near side along a first direction. The first direction is a direction parallel to a center axis 901A of the first positioning shaft 901 and is also parallel to the X direction, which is an insertion and removal direction of the developing device 10.

On the other hand, to the developing device 10, a first positioning hole 131 and a second positioning hole 132 which engages with the first positioning shaft 901 and the second positioning shaft 902 of the image forming apparatus main assembly 101, respectively, are provided. The first positioning hole 131 and the second positioning hole 132 are formed in the fixing portion 13 so as to be penetrated in a second direction and along a predetermined direction. The second direction and the predetermined direction are parallel to a center axis 131A of the first positioning hole 131.

Here, the first positioning hole 131 is a hole for positioning the developing device 10, and the second positioning hole 132 is an elongated hole which serves as a hole for stopping the developing device 10 from rotating. The second positioning hole 132 is formed so that a length in a vertical direction in a state in which the developing device 10 is mounted on the image forming apparatus main assembly 101 is longer than that of the first positioning hole 131.

Therefore, upon the mounting of the developing device 10, first, the developing device 10 is positioned by the first positioning shaft 901 entering the first positioning hole 131. At this time, the second positioning shaft 902 also enters the second positioning hole 132, however, since the second positioning hole 132 is the elongated hole, the second positioning shaft 902 is not positioned in the vertical direction, but a rotation thereof about an engaging portion between the first positioning hole 131 and the first positioning shaft 901 is restricted.

In the present Embodiment, the first positioning hole 131 corresponds to a positioned portion, and the first positioning shaft 901 which engages with the first positioning hole corresponds to a positioning portion. Incidentally, the relationship between the shaft and the hole may be reversed. That is, one of the positioning portion and the positioned portion should be a hole portion formed along the first direction, and the other should be a protruding portion formed along the second direction and engageable with the hole portion. In short, the positioning portion and the positioned portion should have shapes which are positioned when the developing device 10 is inserted into the image forming apparatus main assembly 101. Incidentally, as for the second positioning shaft 902 and the second positioning hole 132, the relationship between the shaft and the hole may be reversed in the same manner.

An ideal posture is that the center axis 901A of the first positioning shaft 901 described above and the center axis 131A of the first positioning hole 131 is parallel, that is, the first direction and the second direction are parallel. In the ideal posture, the developing device 10 can be mounted on the image forming apparatus main assembly 101 without prying at the engaging portion between the first positioning shaft 901 and the first positioning hole 131. However, as shown in the present Embodiment, in the developing device 10, which is divided into the fixing portion 13, which is fixed to the image forming apparatus main assembly 101, and the developing device main assembly 14, which is movable with respect to the fixing portion 13, there is a possibility that the tilt due to engagement backlash in the engaging portion (first connecting portion) 15, which is the connecting portion between the fixing portion 13 and the developing device main assembly 14, occurs as shown in FIG. 11, and that the center axis 901A of the first positioning shaft 901 and the center axis 131A of the first positioning hole 131 may tilt by an angle θ.

In this case, in the present Embodiment, the center axis 131A of the first positioning hole 131 is also tilted to the rotational axis α of the developing roller 12 by the angle θ. That is, in the present Embodiment, the center axis 901A of the first positioning shaft 901 is parallel to the X direction, which is the insertion and removal direction of the developing device 10, i.e., a direction of the rotational axis α of the developing roller 12. Therefore, when the center axis 131A of the first positioning hole 131 is tilted with respect to the center axis 901A of the first positioning shaft 901 by the angle θ, the center axis 131A of the first positioning hole 131 will also be tilted with respect to the rotational axis α of the developing roller 12 by the angle θ.

FIG. 12 is a cross-sectional view near the engaging portion 15 in a state in which the fixing portion 13 is not tilted with respect to the developing device main assembly 14, and FIG. 13 is a cross-sectional view near the engaging portion 15 in a state in which the fixing portion 13 is tilted with respect to the developing device main assembly 14. The fixing portion 13 is connected so as to be rotatable with respect to the mounting portion 151, to which the pressing force receiving portion 143 is formed, via the rotary shaft **15*a* in the engaging portion 15. The mounting portion 151 is configured to be rotatably supported on a shaft end of the near side of the developing roller 12 via a connecting portion (second connecting portion) 141. By this, it is configured that while the rotation of the developing roller 12 is allowed, the mounting portion 151 is supported by the shaft end of the near side of the developing roller 12. Upon being pressed by the pressing portion 232 as described above, the mounting portion 151 is abutting to the developer container 11 of the developing device main assembly 14 and rotates the developing device main assembly 14 with respect to the fixing portion 13 about the engaging portion 15**.

As mentioned above, the engaging portion 15 is provided with the backlash. To the fixing portion 13 supported via the engaging portion 15, own weight F1 of the fixing portion 13 acts on a position of a center of gravity G, and a rotation moment M10 is generated about the engaging portion 15. That is, to the fixing portion 13, the rotation moment M10 as a first moment is generated due to the backlash of the engaging portion 15 and positional relationship between a position of the engaging portion 15 and the position of the center of gravity G of the fixing portion 13 in a state in which the first positioning hole 131 is not positioned to the first positioning shaft 901.

Between the fixing portion 13 and the developer container 11, which is a part of the developing device main assembly 14, the developer conveyance path 16, which is made of an elastic body, is provided. Therefore, when the above rotation moment M10, which causes the fixing portion 13 to be tilted with respect to the developing device main assembly 14 due to the backlash of the engaging portion 15, is generated, a rotation moment M20 in an opposite direction to the rotation moment M10 is generated about the engaging portion 15 due to an elastic member reaction force F2 of the developer conveyance path 16.

However, in a case in which magnitude of the rotation moment M20 is smaller than magnitude of the rotation moment M10, the fixing portion 13 tilts with respect to the developing device main assembly 14. In addition, upon inserting the developing device 10 into the image forming apparatus main assembly 101, the posture of the developing device 10 during the insertion into the image forming apparatus main assembly 101 will follow the developing device main assembly 14 since the developing device main assembly 14 is inserted along an insertion and removal guide, not shown. In other words, the tilt between the fixing portion 13 and the developing device main assembly 14 can be considered as a tilt between the fixing portion 13 and the image forming apparatus main assembly 101.

Therefore, as shown in FIG. 13, when the developing device 10 is attempted to be mounted on the image forming apparatus main assembly 101 in a state in which the fixing portion 13 is tilted with respect to the developing device main assembly 14, as shown in FIG. 11, the center axis 901A of the first positioning shaft 901 being provided to the image forming apparatus main assembly 101 and the center axis 131A of the first positioning hole 131 being provided to the fixing portion 13 will be tilted by the angle θ. If θ is large, the first positioning shaft 901 and the first positioning hole 131 may not be engaged smoothly with each other, thereby making it difficult or even impossible to insert the developing device 10 to the normal position. As a result, replacement workability of the developing device 10 is reduced. Therefore, the present Embodiment is configured as follows.

[Urging Portion which Urges the Fixing Portion]

FIG. 14 is a cross-sectional view illustrating near the engaging portion 15 of the present Embodiment. In the present Embodiment, an urging portion 19, which urges the fixing portion 13 to generate a second moment of an opposite direction to the above rotation moment M10, is provided between the fixing portion 13 and the developing device main assembly 14. The urging portion 19 is constituted by the above developer conveyance path 16 and the elastic member 18. The elastic member 18 is disposed between the fixing portion 13 and the developing device main assembly 14 so as to be positioned adjacent to the developer conveyance path 16 and urges the fixing portion 13 to generate a rotation moment M30, which is a moment of the opposite direction to the rotation moment M10, to the fixing portion 13.

In other words, in the present Embodiment, it is configured that the elastic member 18 is provided between the fixing portion 13 and the developing device main assembly 14 to the configuration described above. An elastic member reaction force F3 of the elastic member 18 is set to generate the rotation moment M30 which is sufficient to eliminate the tilt θ of the fixing portion 13.

Specifically, it is configured that by giving the rotation moment M30, which balances the rotation moment M10 due to its own weight and the rotation moment M20 due to the developer conveyance path 16, to the fixing portion 13 by the elastic member 18, the tilt θ of the fixing portion 13 is corrected. Therefore, the rotation moment M20 caused by the developer conveyance path 16 plus the rotation moment M30 caused by the elastic member 18 is equivalent to the second moment of the opposite direction to the rotation moment M10 as the first moment.

And in the present Embodiment, in a state in which the first moment and the second moment are balanced, that is, in a state in which the rotation moment M10, the rotation moment M20 and the rotation moment M30 are balanced, it is configured so that the angle (acute angle) θ between a direction parallel to the center axis 901A of the first positioning shaft 901 (first direction) and a direction parallel to the center axis 131A of the first positioning hole 131 (second direction and predetermined direction) is equal to or lower than 3°. In other words, in the state in which the rotation moment M10, the rotation moment M20 and the rotation moment M30 are balanced, the angle (acute angle) θ between the direction parallel to the center axis 131A of the first positioning hole 131 (predetermined direction) and the rotational axis α of the developing roller 12 is equal to or lower than 3°.

Since a rotation moment M around the engaging portion 15 is defined by product of force F and an arm length L, upon generating a rotation moment of the same size, the farther a position of an action point of the force is from a center position of the rotation moment, the smaller the force F can be. The elastic member reaction force F3 of the elastic member 18 is reaction force of the pressing force which presses the developing device main assembly 14 by the development pressing mechanism 23. In addition, the elastic member 18 is disposed at the near side of the developing device 10. Therefore, if F3 is large, a difference in pressing force between the developing device main assembly 14 and the photosensitive member unit 20 may occur between the near side and the back side, which may cause problems in the image formation.

In the present Embodiment, the center position of the rotation moment is the engaging portion 15, and the arm length Lis a distance between the engaging portion 15 and the action point of the force in the axial direction of the center axis 901A of the first positioning shaft 901. The elastic member 18 is disposed at a position farther from the position of the center of gravity G of the fixed portion 13 and the developer conveyance path 16 with respect to the engaging portion 15. That is, the elastic member 18 is disposed so that a distance L3 from the engaging portion 15 to the elastic member 18 with respect to the axial direction of the center axis 901A is longer than a distance L1 from the engaging portion 15 to the position of the center of gravity G of the fixed portion 13, and longer than a distance L2 from the engaging portion 15 to the developer conveyance path 16. Therefore, the elastic member 18 can generate the rotation moment M30 which corrects the tilt of the fixing portion 13 with small force. Incidentally, a reference position of the engaging portion 15 for the distance L1, the distance L2 and the distance L3 is a position of an end portion of the back side of the mounting portion 151 in the engaging portion 15.

Thus, in the present Embodiment, it is configured that by providing the elastic member 18 between the fixing portion 13 and the developing device main assembly 14, the tilt of the fixing portion 13 due to the backlash of the engaging portion 15 is corrected. As a result, the posture of the first positioning hole 131 of the fixing portion 13 and the posture of the first positioning shaft 901 of the image forming apparatus main assembly 101 becomes the ideal state shown in FIG. 10, or close to the ideal state, and the developing device 10 can be mounted on the image forming apparatus main assembly 101 without prying.

Here, in the present Embodiment, it is configured that by providing the elastic member 18 in addition to the developer conveyance path 16, the angle θ between the direction parallel to the center axis 901A of the first positioning shaft 901 and the direction parallel to the center axis 131A of the first positioning hole 131 in a state in which the rotation moment M10, the rotation moment M20 and the rotation moment M30 are balanced becomes equal to or lower than 3°. Results of examination of relationship between the angle θ and the prying upon mounting the developing device 10 on the image forming apparatus main assembly 101 will be described using FIG. 15.

As shown in FIG. 15, when the angle θ exceeds 3° in absolute value, the first positioning hole 131 of the developing device 10 and the first positioning shaft 901 of the image forming apparatus main assembly 101 cannot be engaged to the normal position, and even by performing an additional pushing work, which pushes the developing device 10 in the inserting direction further from the state in which the engagement is not possible, it is impossible to push the developing device 10 to the normal position. When the angle θ is in a range between an equal to or higher than 1° and an equal to or lower than 3° in absolute value, although the prying occurred in the engaging portion between the first positioning hole 131 and the first positioning shaft 901, the developing device 10 can be mounted to the normal position by performing the additional pushing work. When the angle θ is less than 1° in absolute value, the developing device 10 can be mounted on the image forming apparatus main assembly 101 without prying at the engaging portion between the first positioning hole 131 and the first positioning shaft 901. Thus, in the present Embodiment, it is configured that the angle θ is equal to or lower than 3°. As a result, it becomes possible to improve the replacement workability of the developing device 10 with respect to the image forming apparatus main assembly 101.

Embodiment 2

An Embodiment 2 will be described using FIG. 16 and FIG. 17. In the Embodiment 1 described above, the urging portion 19 is configured to generate the second moment of the opposite direction to the first moment, which occurs in the fixing portion 13 due to the backlash of the engaging portion 15 and the relationship between the position of the engaging portion 15 and the position of the center of gravity of the fixing portion 13. In contrast, in the present Embodiment, urging force of an urging portion 19A is set in consideration of reaction force of a shutter urging portion 105 of the image forming apparatus main assembly 101 side, which acts on the fixing portion 13 when the developing device 10 is inserted.

First, a configuration of a shutter of the image forming apparatus main assembly 101 side will be described using FIG. 16. The image forming apparatus main assembly 101 is provided with a supply port 103 for supplying developer to the developing device 10, a shutter 104, which opens and closes the supply port and the shutter urging portion 105, such as a spring, which urges the shutter 104 in a closing direction. The shutter 104 moves against the urging force of the urging portion, upon insertion of the developing device 10 into the image forming apparatus main assembly 101, to open the supply port 103. In the shutter 104, a through hole 104*a* is formed. The supply port 103 and the toner replenishing port 133 of the developing device 10 side are then communicated through the through hole 104*a*, and it becomes possible for the developer to be supplied to the toner replenishing port 133 via the supply port 103.

Therefore, the fixing portion 13 of the developing device 10 is provided with a contacting portion of the fixing portion side 134 and the toner replenishing port 133 as the replenishing port. The contacting portion of the fixing portion side 134 contacts the shutter 104 and opens the shutter 104 against the urging force of the urging portion 105 upon mounting of the developing device 10 on the image forming apparatus main assembly 101. The toner replenishing port 133 is connected to the supply port 103 when the developing device 10 is mounted on the image forming apparatus main assembly 101.

In the configuration in which the shutter 104 is opened in interrelation with the mounting operation of the developing device 10, the developing device 10 receives reaction force from the shutter 104. In the developing device 10 of the present Embodiment, as described above, the toner replenishing port 133, which is connected to the supply port 103, is provided to the fixing portion 13, and the contacting portion of the fixing portion side 134, which contacts the shutter 104 to open the shutter 104, is also provided to the fixing portion 13. Therefore, the fixing portion 13 receives external force F4 due to the reaction force of the shutter 104 upon insertion of the developing device 10. Then, as shown in FIG. 17, the fixing portion 13 receives a rotation moment M40 about the engaging portion 15.

FIG. 17 is a view illustrating the external force F4 due to the reaction force of the shutter urging portion 105 acting on the fixing portion 13. In FIG. 17, the urging force of the urging portion 19 is not set in consideration of the external force F4. Therefore, the fixing portion 13 may tilt due to the rotation moment M40 caused by the external force F4. Incidentally, the rotation moment M40 is the product of the external force F4 and a distance L4 from the engaging portion 15 to the contacting portion of the fixing portion side 134.

Therefore, in the present Embodiment, the urging portion 19A is provided between the fixing portion 13 and the developing device main assembly 14, as shown in FIG. 16. Here, a rotation moment adding the rotation moment M40, which acts on the fixing portion 13 due to the reaction force of the shutter urging portion 105 upon mounting the developing device 10 on the image forming apparatus main assembly 101, to the rotation moment M10, which is generated in the fixing portion in a state in which the first positioning hole 131 is not positioned in the first positioning shaft 901 due to the backlash of the engaging portion 15 and the positional relationship between the position of the engaging portion 15 and the position of the center of gravity G of the fixing portion 13, is defined as a third moment. The urging portion 19A urges the fixing portion 13 to generate a fourth moment of an opposite direction to the third moment at the fixing portion 13.

The urging portion 19A is provided with, as in the Embodiment 1, a developer conveyance path 16A, which is an elastic member, and an elastic member 18A. And by adjusting the urging force, it is configured to generate the fourth moment as described above. For example, the developer conveyance path 16A is configured to be the same as the developer conveyance path 16 of the Embodiment 1 described above, and the elastic member 18A is configured to generate greater force than the elastic member 18 of the Embodiment 1. That is, a moment in which the rotation moment M31 due to the elastic member 18A is added to the rotation moment M20 due to the developer conveyance path 16A is equivalent to the fourth moment of an opposite direction to the third moment (rotation moment M10+M40). Then, as in the Embodiment 1, it is configured that in a state in which the third moment and the fourth moment are balanced, the angle (acute angle) θ between the direction parallel to the center axis 901A of the first positioning shaft 901 (first direction) and the direction parallel to the center axis 131A of the first positioning hole 131 (second direction and predetermined direction) is equal to or lower than 3°.

Thus, in the present Embodiment, it is configured that by providing the elastic member 18A between the fixing portion 13 and the developing device main assembly 14, the tilt of the fixing portion 13 due to the backlash of the engaging portion 15 and the reaction force of the shutter urging portion 105 upon insertion of the developing device 10 is corrected. As a result, the posture of the first positioning hole 131 of the fixing portion 13 and the posture of the first positioning shaft 901 of the image forming apparatus main assembly 101 becomes the ideal state shown in FIG. 10, or close to the ideal state, and the developing device 10 can be mounted on the image forming apparatus main assembly 101 without prying. Then it becomes possible to improve the replacement workability of the developing device 10 with respect to the image forming apparatus main assembly 101.

Embodiment 3

An Embodiment 3 will be described using FIG. 18. In the Embodiment 1 and the Embodiment 2 described above, in order to suppress the tilt of the fixing portion 13 due to the backlash of the engaging portion 15, the elastic member 18 and the elastic member 18A are provided in addition to the developer conveyance path 16 and the developer conveyance path 16A, respectively. In contrast, in the present Embodiment, it is configured that only a developer conveyance path 16B is used to suppress the tilt of the fixing portion 13 due to the backlash of the engaging portion 15. Since other configurations and actions are the same as those of the Embodiment 2 described above, the same reference numeral will be attached to the same configurations to omit or simplify the description and illustration, and description will focus on points that differ from those of the Embodiment 2 hereinafter.

FIG. 18 is a cross-sectional view illustrating near the engaging portion 15 of the present Embodiment. In the present Embodiment, an urging portion 19B, which is disposed between the fixing portion 13 and the developing device main assembly 14 and which urges the fixing portion 13, is constituted only by a developer conveyance path 16B. That is, as in the Embodiment 2, the fixing portion 13 is urged to generate the fourth moment of the opposite direction to the third moment, in which the rotation moment M10 is added to the rotation moment M40, at the fixing portion 13 only by the developer conveyance path 16B, without providing the elastic member 18A.

Methods to vary the elastic member reaction force F2 of the developer conveyance path 16B include changing the Young's modulus by changing material of the developer conveyance path 16B, changing a thickness of the material, changing a free length, etc. Incidentally, even in the configuration of the Embodiment 1, it is also possible to configure that the fixing portion 13 is urged only by the developer conveyance path, as in the present Embodiment. In such Embodiments, it is possible to improve the replacement workability of the developing device 10 without increasing a number of parts from a conventional configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195666 filed on Dec. 7, 2022, which is hereby incorporated by reference herein in its entirety.

What is claimed is:

1. A developing device mountable on an image forming apparatus, the developing device comprising:

a main body portion including a developer container configured to accommodate a developer containing toner and a carrier, and a developer carrying member configured to carry and feed the developer to a developing position where an electrostatic image formed on an image bearing member is developed;

a fixing portion fixed to the image forming apparatus to mount the developing device on the image forming apparatus in a state in which the main body portion is positioned in the image forming apparatus and the fixing portion is positioned in the image forming apparatus;

a connecting portion configured to connect the main body portion and the fixing portion;

a toner replenishing port provided to the fixing portion and where the toner is replenished from the image forming apparatus;

a connection port provided to the main body portion and connecting to the developer container for supplying the toner replenished through the toner replenishing port to the developer container;

a toner conveyance path provided between the main body portion and the fixing portion and through which the toner is capable of communicating between the toner replenishing port and the connection port; and an urging portion, when a first moment is defined as a moment which is generated in the fixing portion due to own weight about the connecting portion as a rotation center in a state in which the main body portion is positioned in the image forming apparatus and the fixing portion is not positioned in the image forming apparatus, configured to urge the fixing portion so as to generate a second moment in an opposite direction to the first moment to the fixing portion about the connecting portion as the rotation center in a state in which the main body portion is positioned in the image forming apparatus and the fixing portion is not positioned in the image forming apparatus, and wherein in a case where the developing device is pressed by a pressing portion of the image forming apparatus in a state in which the fixing portion is fixed to the image forming apparatus, the main body portion is rotated about the connecting portion as the rotation center so that the developer carrying member is moved from a separated position separated from the developing position to the developing position.

2. A developing device according to claim 1, wherein the urging portion is an elastic member provided between the main body portion and the fixing portion.

3. A developing device according to claim 1, wherein the fixing portion is located upstream of the developer carrying member with respect to a mounting direction in which the developing device is mounted on the image forming apparatus.

4. A developing device according to claim 1, wherein a position where the fixing portion is positioned in the image forming apparatus is located upstream of a position where the main body portion is positioned in the image forming apparatus with respect to a mounting direction in which the developing device is mounted on the image forming apparatus.

5. A developing device according to claim 1, wherein the fixing portion is fixed to the image forming apparatus by a fastening member in a state in which the main body portion is positioned in the image forming apparatus and the fixing portion is positioned in the image forming apparatus.

6. A developing device according to claim 1, wherein with respect to a mounting direction in which the developing device is mounted on the image forming apparatus, in a case where a distance from the connecting portion to a position of a center of gravity of the fixing portion is L1, a distance from the connecting portion to the toner conveyance path is L2, and a distance from the connecting portion to the urging portion is L3, the following relationship is satisfied:

L1<L2<L3.

7. A developing device according to claim 1, wherein with respect to a mounting direction in which the developing device is mounted on the image forming apparatus, the toner conveyance path is located upstream of the connecting portion, and the urging portion is located upstream of the toner conveyance path.

8. A developing device according to claim 1, wherein the urging portion is a spring provided between the main body portion and the fixing portion.

9. A developing device according to claim 1, wherein the toner conveyance path is formed by a bellows-shaped elastic member.

10. A developing device according to claim 1, wherein the fixing portion includes a first hole portion, the main body portion includes a second hole portion, and the connecting portion includes a shaft portion engaged with the first hole portion and the second hole portion.

* * * * *